United States Patent
Luo et al.

(10) Patent No.: US 8,498,242 B2
(45) Date of Patent: Jul. 30, 2013

(54) CELL SEARCH BASED ON BEACON IN A WIRELESS COMMUNICATION SYSTEM

(75) Inventors: Tao Luo, San Diego, CA (US); Durga Prasad Malladi, San Diego, CA (US); Hao Xu, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1065 days.

(21) Appl. No.: 12/444,577

(22) PCT Filed: Nov. 6, 2007

(86) PCT No.: PCT/US2007/083821
§ 371 (c)(1), (2), (4) Date: Jun. 30, 2009

(87) PCT Pub. No.: WO2008/058150
PCT Pub. Date: May 15, 2008

(65) Prior Publication Data
US 2010/0091702 A1  Apr. 15, 2010

Related U.S. Application Data

(60) Provisional application No. 60/864,577, filed on Nov. 6, 2006.

(51) Int. Cl.
*H04W 4/00* (2009.01)
*H04J 4/00* (2006.01)
*H04B 7/00* (2006.01)

(52) U.S. Cl.
USPC .......... 370/328; 370/210; 370/329; 370/330; 370/478; 455/435.1; 455/526

(58) Field of Classification Search
USPC .................................. 370/328–463
See application file for complete search history.

(56) References Cited

U.S. PATENT DOCUMENTS 5,736,964 A  4/1998 Ghosh et al.
6,968,194 B2 * 11/2005 Aljadeff et al. ............ 455/456.1

(Continued)

FOREIGN PATENT DOCUMENTS

RU  2127963 C1  3/1999
WO  2005109657  11/2005
WO  2005109917  11/2005

OTHER PUBLICATIONS

International Search Report and Written Opinion, PCT/US2007/083821, International Searching Authority, European Patent Office, Aug. 6, 2008.
Taiwan Search Report—TW096141949—TIPO—Feb. 11, 2012.

*Primary Examiner* — Ayaz Sheikh
*Assistant Examiner* — Venkatesh Haliyur
(74) *Attorney, Agent, or Firm* — Liem T. Do

(57) ABSTRACT

Techniques for transmitting beacon signals to assist user equipments (UEs) perform cell search and techniques for detecting for beacon signals are described. In an aspect, cells may be assigned beacon patterns defined based on orthogonal grouping of subcarriers. U subcarriers usable for beacon may be arranged into G orthogonal groups, with each group including S subcarriers. $P=S^G$ different beacon patterns may be defined based on the G groups of S subcarriers. In another aspect, the cells may transmit their beacon signals at configurable transmit power levels, which may be determined based on target beacon detection performance. In yet another aspect, a UE may perform overlapping DFTs in order to capture more received power when symbol timing at the UE is not aligned with symbol timing of cells being detected. In yet another aspect, the UE may perform beacon detection with maximal likelihood decoding.

47 Claims, 14 Drawing Sheets

U.S. PATENT DOCUMENTS

| | | | |
|---|---|---|---|
| 7,092,353 B2 * | 8/2006 | Laroia et al. | 370/210 |
| 7,383,057 B1 * | 6/2008 | Senarath et al. | 455/522 |
| 7,545,734 B2 * | 6/2009 | Ma et al. | 370/208 |
| 7,577,122 B1 * | 8/2009 | Schultz et al. | 370/338 |
| 7,653,483 B2 * | 1/2010 | Schmidt et al. | 701/507 |
| 7,746,758 B2 * | 6/2010 | Stolpman | 370/203 |
| 2003/0002471 A1 * | 1/2003 | Crawford et al. | 370/343 |
| 2005/0233752 A1 | 10/2005 | Laroia et al. | |
| 2005/0250469 A1 * | 11/2005 | Laroia et al. | 455/403 |
| 2006/0188031 A1 * | 8/2006 | Liu | 375/260 |
| 2008/0019263 A1 * | 1/2008 | Stolpman | 370/210 |
| 2008/0095108 A1 * | 4/2008 | Malladi et al. | 370/329 |
| 2008/0205534 A1 * | 8/2008 | Logvinov et al. | 375/260 |
| 2009/0125792 A1 * | 5/2009 | Lakkis | 714/783 |
| 2009/0129338 A1 * | 5/2009 | Horn et al. | 370/331 |
| 2009/0131061 A1 * | 5/2009 | Palanki et al. | 455/446 |
| 2010/0046447 A1 * | 2/2010 | Palanki et al. | 370/329 |
| 2010/0091702 A1 * | 4/2010 | Luo et al. | 370/328 |
| 2010/0142365 A1 * | 6/2010 | Richardson et al. | 370/210 |
| 2010/0309853 A1 * | 12/2010 | Richardson et al. | 370/329 |
| 2011/0051825 A1 * | 3/2011 | Tao et al. | 375/260 |
| 2012/0094687 A1 * | 4/2012 | Choi et al. | 455/456.1 |
| 2012/0157117 A1 * | 6/2012 | Choi et al. | 455/456.1 |

* cited by examiner

PSC = Primary synchronization signal
SSC = Secondary synchronization signal
BSC = Beacon signal

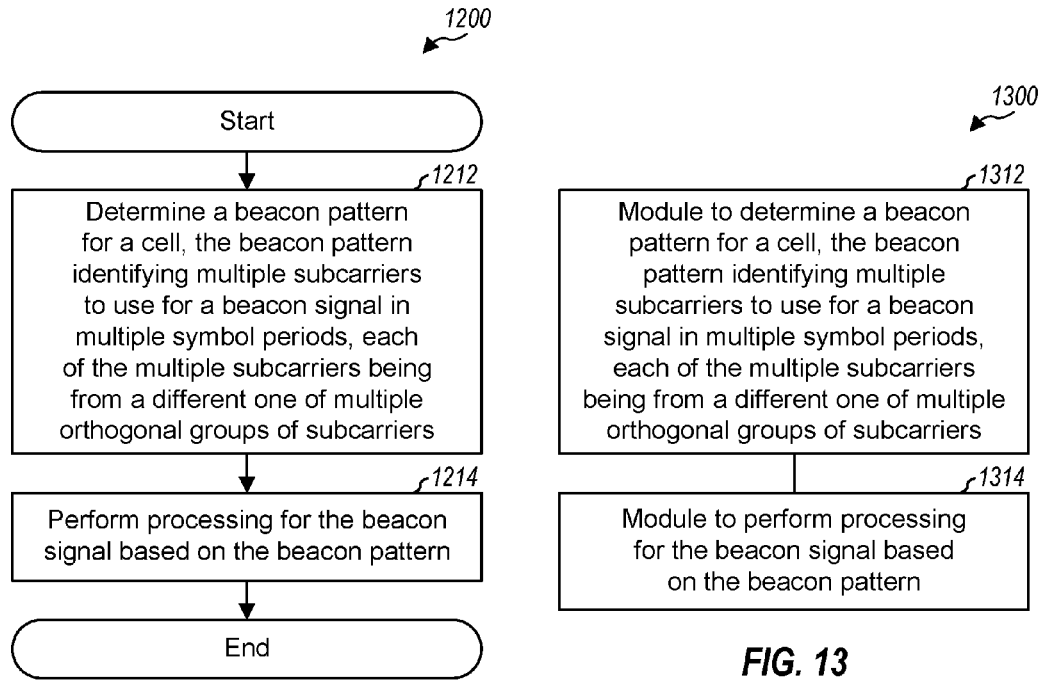
FIG. 12
FIG. 13
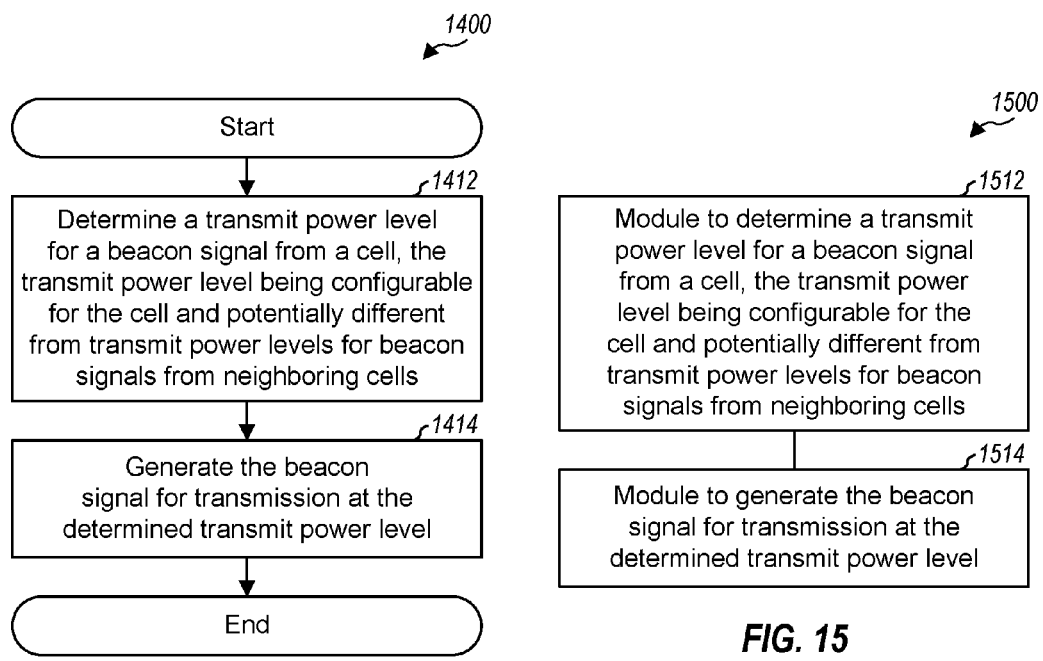
FIG. 14
FIG. 15

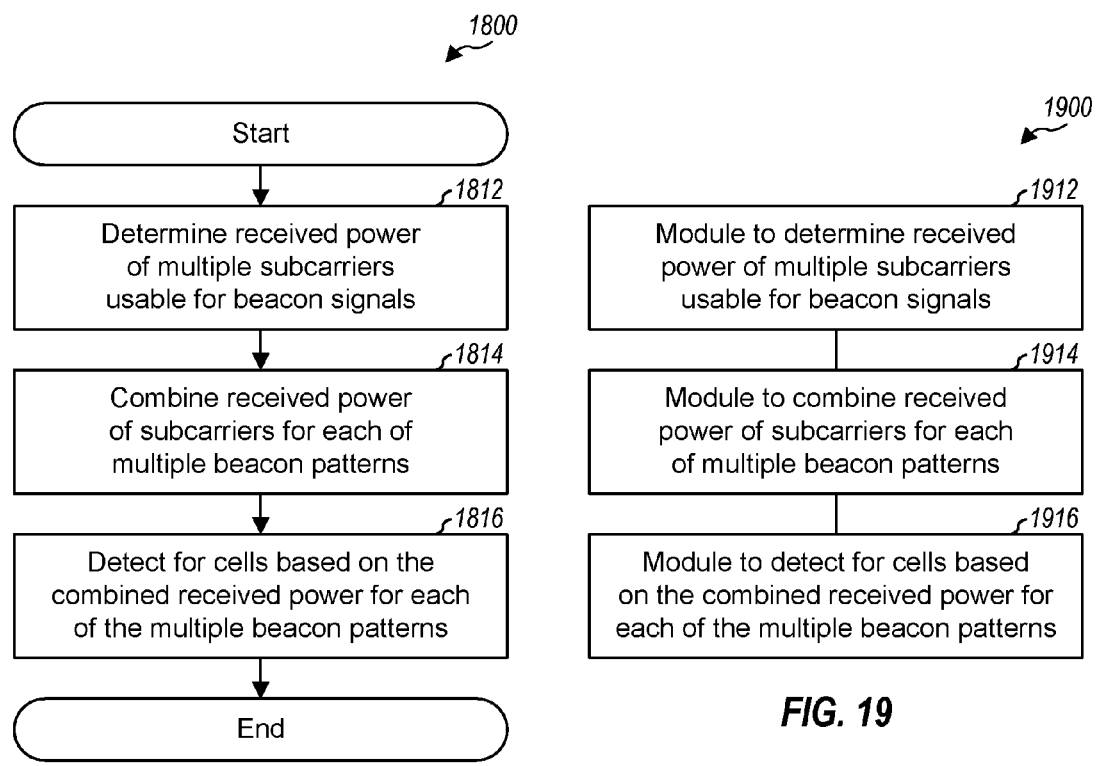

CELL SEARCH BASED ON BEACON IN A WIRELESS COMMUNICATION SYSTEM

The present application claims priority to provisional U.S. Application Ser. No. 60/864,577, entitled "METHOD OF CELL SEARCH FOR OFDM SYSTEM," filed Nov. 6, 2006, assigned to the assignee hereof and incorporated herein by reference.

BACKGROUND

I. Field

The present disclosure relates generally to communication, and more specifically to techniques for searching for cells in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include any number of base stations that can support communication for any number of user equipments (UEs). A UE (e.g., a cellular phone) may be within the coverage of zero, one, or multiple base stations at any given moment. The UE may have just been powered on or may have lost coverage and thus may not know which base stations can be received. The UE may perform cell search to detect for base stations and to acquire timing and other information for the detected base stations. The UE may also be in communication with one or more base stations and may be mobile. The UE may perform cell search to detect for better base stations to serve the UE.

Each base station may transmit synchronization signals to assist the UEs perform cell search. In general, a synchronization signal may be any signal that allows a receiver to detect for a transmitter and to obtain information, e.g., timing and identity, of the transmitter. The synchronization signals represent overhead and should be transmitted as efficiently as possible. Furthermore, the synchronization signals should allow the UEs to perform cell search as quickly and efficiently as possible.

SUMMARY

Techniques for transmitting beacon signals to assist UEs perform cell search are described herein. Techniques for detecting for beacon signals are also described herein. In one aspect, cells in a system may be assigned beacon patterns defined based on orthogonal grouping of subcarriers. U subcarriers usable for beacon may be arranged into G orthogonal groups, with each group including S subcarriers. $P=S^G$ different beacon patterns may be defined based on the G groups of S subcarriers. Each beacon pattern may be associated with a specific subcarrier in each group to use for a beacon signal. A base station for a cell may generate a beacon signal based on the beacon pattern for that cell. A UE may detect for the beacon signal from the cell based on the beacon pattern.

In another aspect, the cells in the system may transmit their beacon signals at reduced power levels instead of full power. The transmit power for the beacon signal from each cell may be configurable and determined based on a target detection probability, a target false alarm probability, etc. Different cells may use different transmit power levels for their beacon signals to achieve the desired detection performance while reducing interference to other cells.

In yet another aspect, a UE may perform overlapping discrete Fourier transforms (DFTs) in order to capture more received power when symbol timing of the UE is not aligned with symbol timing of cells being detected, which may be the case in an asynchronous system. The UE may perform first DFTs based on first symbol timing to obtain first received symbols for multiple subcarriers. The UE may also perform second DFTs based on second symbol timing to obtain second received symbols for the multiple subcarriers. The second symbol timing may be offset from the first symbol timing by a fixed or configurable fraction of a symbol period. Received power of the multiple subcarriers may be determined based on the first and second received symbols and may be used to detect for beacon signals from cells.

In yet another aspect, a UE may perform beacon detection with maximal likelihood decoding. The UE may determine received power of multiple subcarriers usable for beacon signals and may combine received power of subcarriers for each possible beacon pattern. The UE may then detect for cells based on the combined received power for each of the possible beacon patterns. The UE may compare the combined received power for each beacon pattern against a threshold and may declare a detected cell for each beacon pattern with combined received power exceeding the threshold.

Various aspects and features of the disclosure are described in further detail below.

BRIEF DESCRIPTION OF THE DRAWINGS

FIGS. 12 and 13 show a process and an apparatus, respectively, for processing a beacon signal.

FIGS. 14 and 15 show a process and an apparatus, respectively, for transmitting beacon with configurable transmit power.

FIGS. 18 and 19 show a process and an apparatus, respectively, for beacon detection with maximal likelihood decoding.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other CDMA variants. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA, E-UTRA and GSM are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, GSM, UMTS and LTE are described in documents from an organization named "3rd Generation Partnership Project" (3GPP). cdma2000 and UMB are described in documents from an organization named "3rd Generation Partnership Project 2" (3GPP2). These various radio technologies and standards are known in the art. For clarity, certain aspects of the techniques are described below for LTE, and LTE terminology is used in much of the description below.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. The spacing between adjacent subcarriers may be fixed, and the total number of subcarriers (K) may be dependent on the system bandwidth. Each subcarrier may be modulated with data. In general, modulation symbols are sent in the frequency domain with OFDM and in the time domain with SC-FDM. To generate an OFDM symbol, symbols with non-zero values may be mapped to subcarriers used for transmission, and symbols with zero values may be mapped to remaining subcarriers. K symbols for the K total subcarriers may be transformed to the time domain to obtain K time-domain samples. The last C samples may be copied and appended to the front of the K samples to obtain an OFDM symbol containing K+C samples. The copied samples are referred to as a cyclic prefix, and C is the cyclic prefix length.

Figure 1:
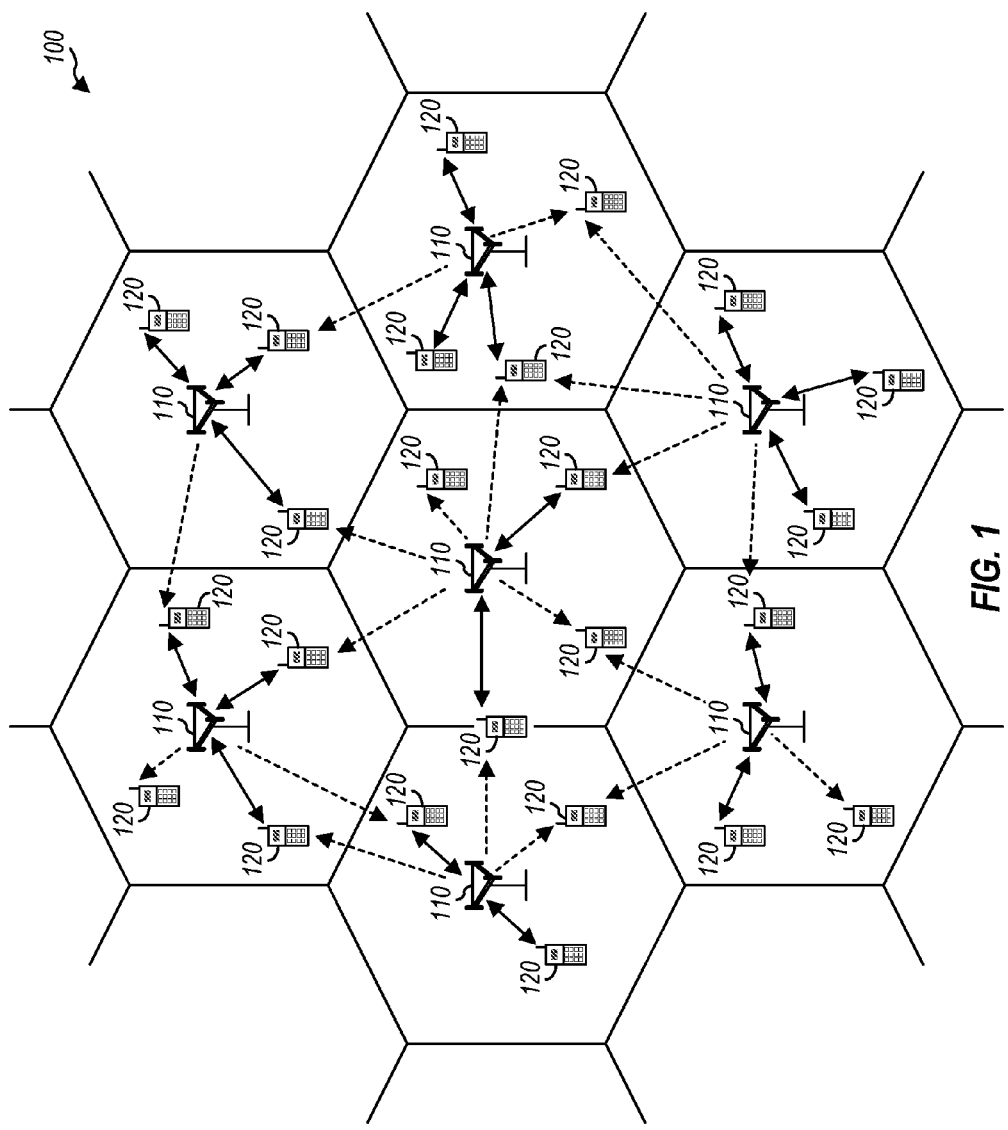
FIG. 1 shows a wireless communication system.

FIG. 1 shows a wireless communication system 100 with multiple Node Bs 110. A Node B may be a fixed station used for communicating with the UEs and may also be referred to as an evolved Node B (eNB), a base station, an access point, etc. Each Node B 110 provides communication coverage for a particular geographic area. The overall coverage area of each Node B 110 may be partitioned into multiple (e.g., three) smaller areas. In 3GPP, the term "cell" can refer to the smallest coverage area of a Node B and/or a Node B subsystem serving this coverage area. In other systems, the term "sector" can refer to the smallest coverage area and/or the subsystem serving this coverage area. For clarity, 3GPP concept of cell is used in the description below.

UEs 120 may be dispersed throughout the system. A UE may be stationary or mobile and may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. A UE may communicate with one or more Node Bs via transmissions on the downlink and uplink. The downlink (or forward link) refers to the communication link from the Node Bs to the UEs, and the uplink (or reverse link) refers to the communication link from the UEs to the Node Bs. In FIG. 1, a solid line with double arrows indicates communication between a Node B and a UE. A broken line with a single arrow indicates a UE receiving a downlink signal from a Node B. A UE may perform cell search based on the downlink signals transmitted by the Node Bs.

In system 100, Node Bs 110 may transmit synchronization signals to allow UEs 120 to detect for the Node Bs and to obtain information such as timing, frequency offset, cell identifier (ID), etc. lists three types of synchronization signals that may be transmitted by a Node B and provides a short description for each type of synchronization signal.

TABLE 1

| Symbol | Synchronization signal | Description |
| --- | --- | --- |
| PSC | Primary synchronization signal | A synchronization signal used for cell detection during initial cell search. |
| SSC | Secondary synchronization signal | A synchronization signal used for cell identification during initial cell search. |
| BSC | Beacon signal | A synchronization signal used for cell search to detect for neighbor cells. |

Figure 2:
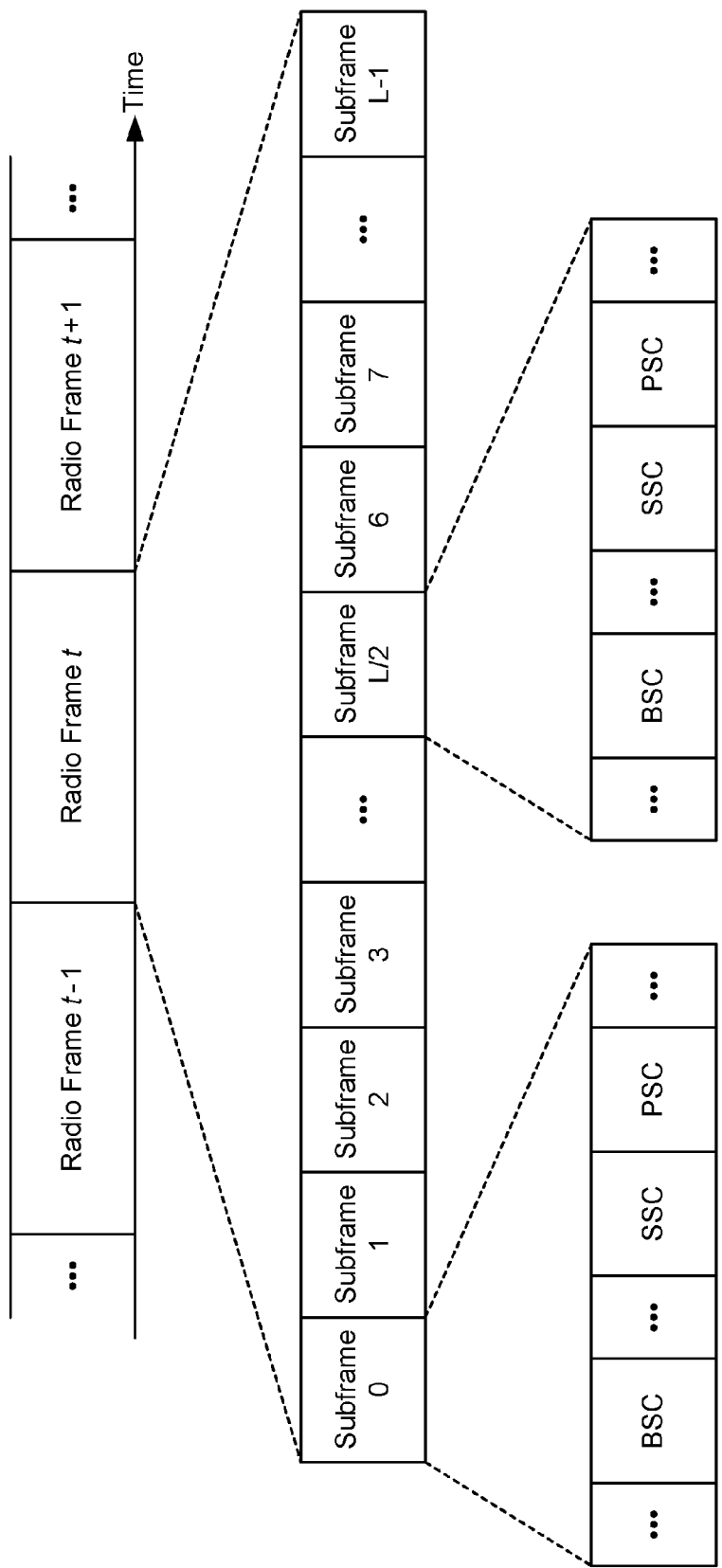
FIG. 2 shows transmission of three synchronization signals.

The PSC and SSC for E-UTRA are described in 3GPP TS 36.211, entitled "Physical Channels and Modulation," June 2007. The PSC and SSC for UTRA are described in 3GPP TS 25.213, entitled "Spreading and modulation," May 2007. 3GPP documents are publicly available. The BSC may be generated as described below. FIG. 2 shows example transmission of the three synchronization signals in Table 1 in accordance with one design. The transmission timeline for the downlink may be partitioned into units of radio frames. Each radio frame may be further partitioned into multiple (L) subframes, and each subframe may include multiple (T) symbol periods. In one design, each radio frame has a duration of 10 milliseconds (ms) and is partitioned into L=10 subframes, each subframe has a duration of 1 ms and is partitioned into two slots, and each slot covers 6 or 7 symbol periods depending on the cyclic prefix length. The radio frames may also be partitioned in other manners.

In one design, the PSC is transmitted in the last symbol period of the first slot in each of subframes 0 and 5, which are at the start and middle of a radio frame. The SSC is transmitted just before the PSC in subframes 0 and 5. The BSC may be transmitted in any remaining symbol period in subframe 0 and/or subframe 5. In general, the PSC, SSC and BSC may each be transmitted at any rate and may be transmitted at the same or different rates. The BSC may be transmitted twice in each radio frame (as shown in FIG. 2) or just once in each radio frame. In general, the BSC may be transmitted at any beacon interval $T_{beacon}$ and in any symbol period of a radio frame. For clarity, much of the description below assumes that the BSC is transmitted in one symbol period of each radio frame, so that the beacon interval $T_{beacon}$ is equal to one radio frame.

The cells may transmit beacon signals (or BSC) to allow the UEs to detect and identify these cells. A beacon signal includes high power narrowband signal components (e.g., on one or few subcarriers) that may be much higher in power compared to other signals such as traffic data signals. The beacon signal may be composed of a sequence of beacon symbols. In one design, a beacon symbol is an OFDM symbol in which all or a large fraction of the total cell transmit power is used for one subcarrier, which is referred to as a beacon subcarrier or a beacon tone. In other designs, a beacon symbol may have all or a large fraction of the total cell transmit power on a small number of subcarriers. For clarity, the following description assumes the design in which a beacon symbol uses one beacon subcarrier. Since a large amount of energy is transmitted on just one subcarrier, a beacon signal can be reliably detected even at low signal-to-noise ratio (SNR). Information such as cell ID may be conveyed via the frequency location of the beacon subcarriers in consecutive beacon symbols.

The beacon signals should be designed such that the cells transmitting these beacon signals can be reliably detected and identified by the UEs. Furthermore, the UEs should be able to detect the beacon signals without timing information. This may be desirable in an asynchronous system in which each cell can transmit based on its timing. The beacon signal for each cell may be designed such that the cell can be identified based on the location of the beacon subcarriers across radio frames.

Figure 3:
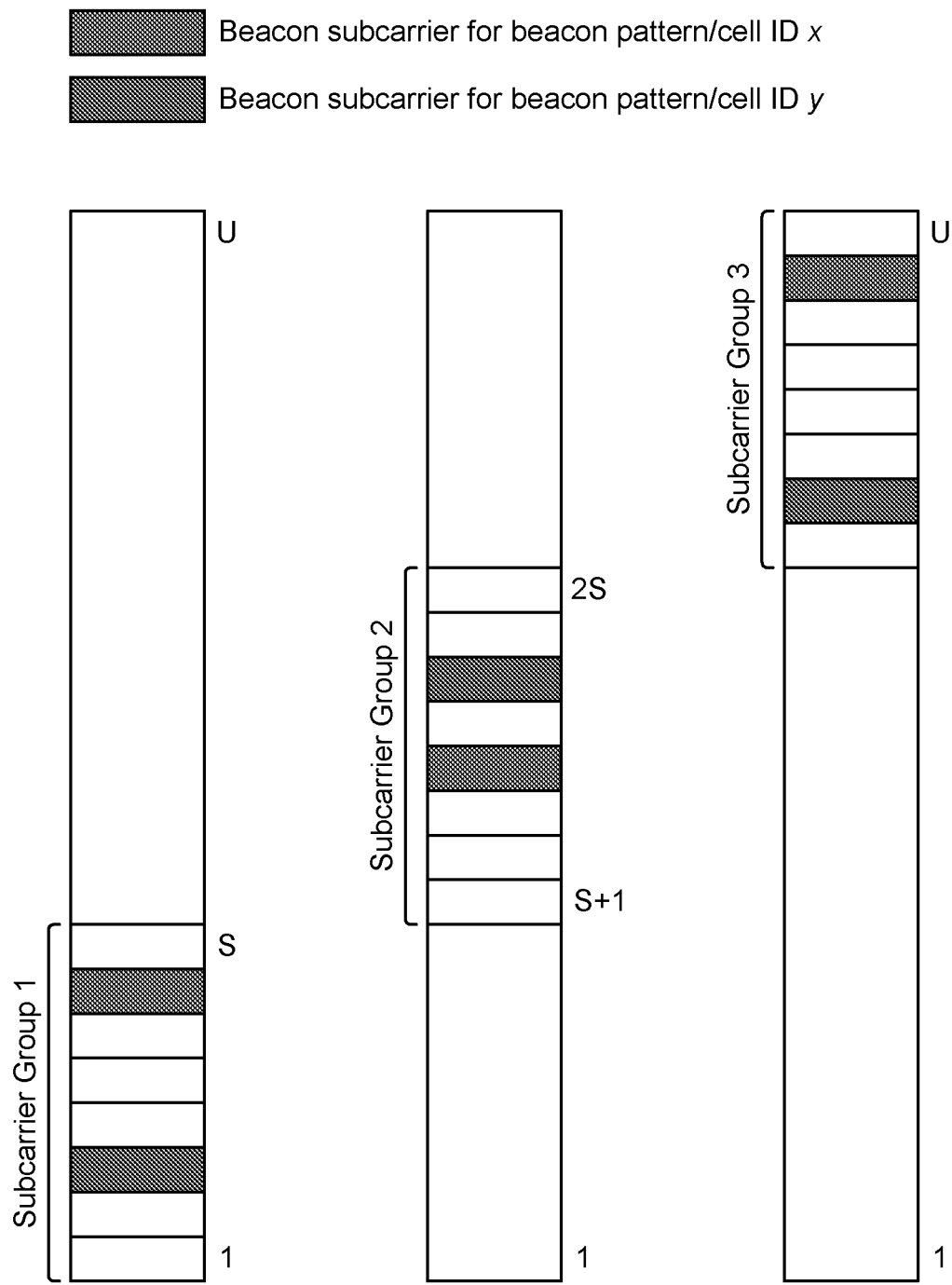
FIG. 3 shows use of orthogonal grouping of subcarriers for beacon signals.

FIG. 3 shows a design of beacon signals based on orthogonal grouping of subcarriers. In this design, U subcarriers may be usable for beacon and may be arranged into G orthogonal groups such that each usable subcarrier belongs in only one group, where U and G may each be any integer value. The orthogonal groups may also be referred to as non-overlapping groups, disjoint groups, etc. Each group may include S subcarriers, which may or may not be consecutive subcarriers among the U=G·S usable subcarriers. $P=S^G$ different beacon patterns may be defined based on the G groups of S subcarriers. Each beacon pattern may have a length of G and may be associated with a specific beacon subcarrier in the first group, a specific beacon subcarrier in the second group, and so on, and a specific beacon subcarrier in the last group. As shown in FIG. 3, different beacon patterns may be associated with different sequences of beacon subcarriers in the G groups. For each beacon pattern, the g-th beacon symbol in the pattern may occupy one of the S subcarriers in group g, where g∈ {0, . . . , G−1}. Each beacon pattern may be viewed as being composed of G non-binary symbols. Each non-binary symbol has one of U possible values and identifies a specific subcarrier to use for a beacon symbol.

The P different beacon patterns may be used for P cell IDs, with each cell ID being associated with a different beacon pattern. The cell-specific beacon patterns may be used by the UEs to detect for cells and to identify the detected cells.

In one design, 75 total subcarriers are available for a bandwidth of 1.25 MHz, with a spacing of 15 KHz between subcarriers. U=24 subcarriers (or about every third subcarrier) are usable for beacon and are spaced apart by 45 KHz. The 24 usable subcarriers are arranged into G=3 groups, with each group including S=8 subcarriers. A total of $P=8^3=512$ beacon patterns may be defined with the three groups of eight subcarriers. Each beacon pattern is associated with a specific beacon subcarrier in the first group, a specific subcarrier in the second group, and a specific subcarrier in the third group.

In general, the number of groups (G) and the number of subcarriers (S) in each group may be selected based on various factors such as the total number of subcarriers, the desired spacing between usable subcarriers, the desired number of beacon patterns, the desired beacon pattern length, etc. A larger spacing between usable subcarriers may allow for more accurate detection of beacon subcarriers by the UEs in the presence of frequency offset but would result in fewer usable subcarriers. The number of beacon patterns may be dictated by the number of cell IDs supported by the system. The beacon pattern length may be determined by the desired beacon detection time, which is the number of beacon symbols needed to detect for cells.

The use of orthogonal grouping of subcarriers allows for detection of beacon signals from cells even with timing ambiguity. A UE may not have timing information for the cells being detected. This may be the case, for example, in an asynchronous system in which the timing of different cells is not synchronized. If the UE detects a beacon subcarrier in group g in a given beacon symbol, then the UE knows to look for a beacon subcarrier in group (g+1) mod G in the next beacon symbol, to look for a beacon subcarrier in group (g+2) mod G in the following beacon symbol, etc., where "mod" denotes a modulo operation. The UE may be able to determine frame timing of a beacon signal based on the group in which the beacon subcarrier is detected. Hence, there is no ambiguity in time shifts due to the use of orthogonal grouping of subcarriers.

In another design, each cell is assigned a cell-specific beacon code that indicates which subcarrier to use for the beacon subcarrier in each beacon symbol. The beacon code may be a Reed-Solomon code or some other maximum distance separable (MDS) code. An MDS code can generate codewords having the largest possible minimum distance between codewords and can thus provide the most error correcting capability for a given amount of redundancy. The beacon code may also be a comma free code that maps a codeword and all cyclic shifts of the codeword to the same cell ID. For example, a codeword may be composed of three non-binary symbols {A, B, C}. The comma free code would map codeword {A, B, C} as well as its cyclic shifted versions {B, C, A} and {C, A, B} to the same cell ID. This properly allows a UE to identify the cell without timing information based on any three consecutive non-binary symbols.

In one example Reed-Solomon code design, M subcarriers are usable for beacon and are assigned indices of 0 through M−1, where M may be any suitable integer value. For a beacon symbol transmitted in radio frame t, the beacon subcarrier $k_t$ may be expressed as:

$$k_t = p_1^{\alpha_1 + Zt} \oplus p_1^{\alpha_2} p_2^{Zt}, \quad \text{Eq (1)}$$

where $p_1$ is a primitive element of field $Z_M$ and $p_2 = p_1^2$,
$\alpha_1$ and $\alpha_2$ are exponent factors determined by the cell ID,
Z is an upper end of the range for $\alpha_1$, and
$\oplus$ denotes modulo addition.

Field $Z_M$ contains M elements 0 through M−1. A primitive element of field $Z_M$ is an element of $Z_M$ that may be used to generate all M−1 non-zero elements of $Z_M$. For example, field $Z_7$ contains seven elements 0 through 6, and 5 is a primitive element of $Z_7$ and may be used to generate all six non-zero elements of $Z_7$ as follows: $5^0$ mod 7=1, $5^1$ mod 7=5, $5^2$ mod 7=4, $5^3$ mod 7=6, $5^4$ mod 7=2, and $5^5$ mod 7=3. $k_t$ is an element of field $Z_M$.

In equation (1), arithmetic operations are over field $Z_M$. For example, addition of A and B may be given as (A+B) mod M, multiplication of A with B may be given as (A·B) mod M, A raised to the power of B may be given as $A^B$ mod M, etc. The additions within the exponents are modulo-M integer additions.

Different beacon codes may be defined with different values of Z and M. The exponent factors $\alpha_1$ and $\alpha_2$ are dependent on Z and M, or more specifically $0 \leq \alpha_1 < Z$ and $0 \leq \alpha_2 < (M-1)$. The beacon code shown in equation (1) is periodic with a period of Q=M/Z symbols. Hence, $k_t = k_{t+Q}$ for any given t.

A cell ID may be mapped to $\alpha_1$ and $\alpha_2$ as follows:

$$\text{cell ID} = (M-1) \cdot \alpha_1 + \alpha_2, \text{ or}$$

$$\text{cell ID} = \alpha_1 + Z \cdot \alpha_2. \qquad \text{Eq (2)}$$

The number of supported cell IDs is dependent on the values of M and Z.

The beacon code shown in equation (1) may be used to generate beacon patterns for all possible cell IDs. For this beacon code, it can be shown that a UE can detect a single cell with any two consecutive or non-consecutive beacon symbols even without timing information. The UE can detect two cells with three consecutive beacon symbols.

Other beacon codes may also be used for beacon. In general, a beacon code of length V may be defined over a Galois field (U) such that there are P codewords for P cell IDs. Each codeword may be composed of V non-binary symbols. Each non-binary symbol may identify one of U subcarriers to use for the beacon subcarrier. A longer length V may mean higher complexity at the UEs but may provide larger coding gain. A cell may be detected based on B non-binary symbols of a codeword, where $2 \leq B \leq V$. This ensures that at high SNR, a cell can be detected with only a subset of the codeword, which can reduce cell search time.

Figure 4:
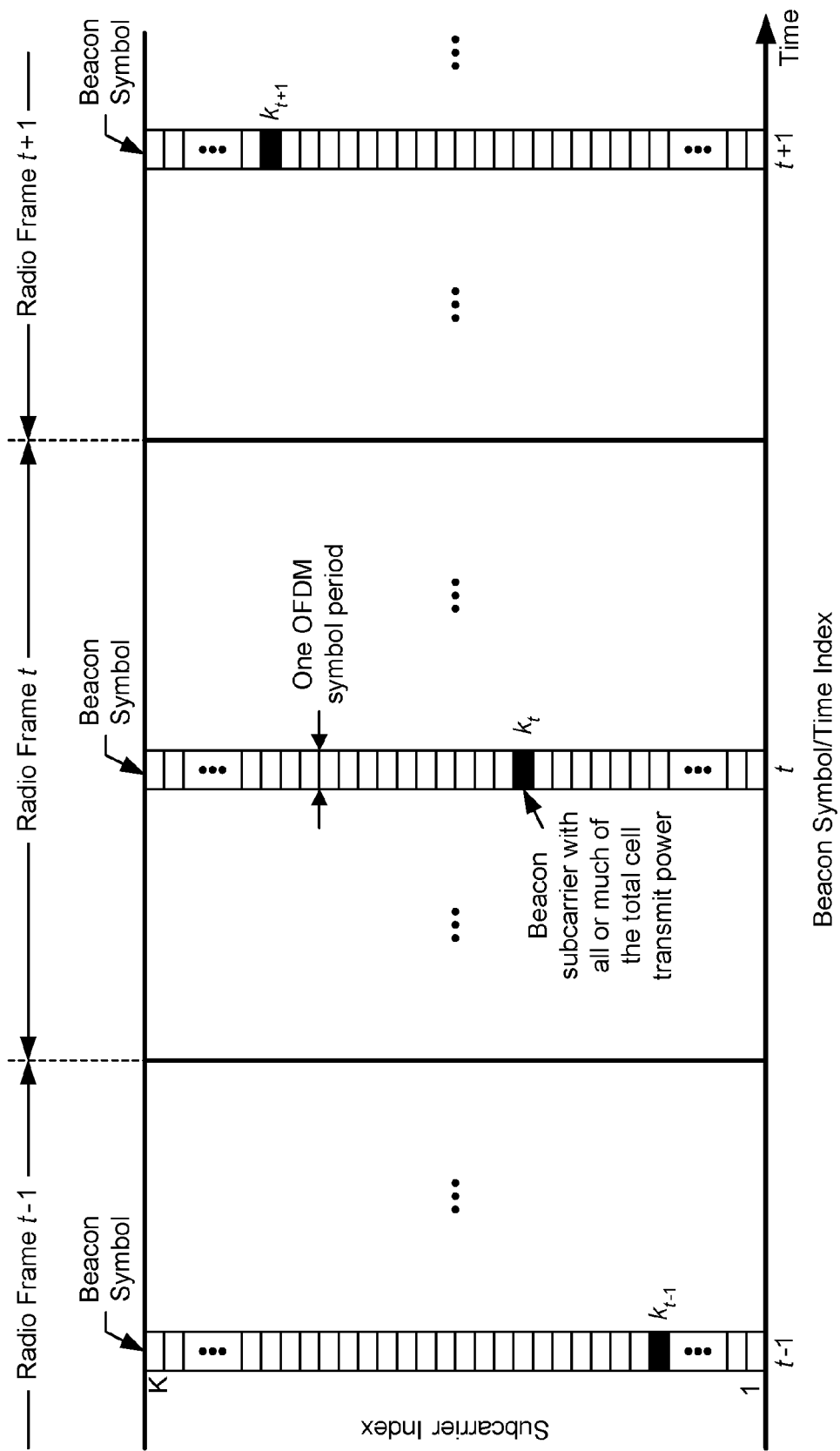
FIG. 4 shows beacon transmission by one cell.

FIG. 4 shows a design of a beacon signal from one cell. In this design, the beacon signal is composed of one beacon symbol in each radio frame. Each beacon symbol has all or much of the total cell transmit power on one beacon subcarrier, which is determined by the beacon pattern for the cell. The beacon pattern may be based on orthogonal grouping of subcarriers, a beacon code, etc. As shown in FIG. 4, different beacon subcarriers may be used for different beacon symbols, and the beacon subcarrier may vary from one beacon symbol to the next. In the example shown in FIG. 4, subcarrier $k_{t-1}$ is used for the beacon symbol transmitted in radio frame t−1, subcarrier $k_t$ is used for the beacon symbol transmitted in radio frame t, subcarrier $k_{t+1}$ is used for the beacon symbol transmitted in radio frame t+1, etc.

Figure 5:
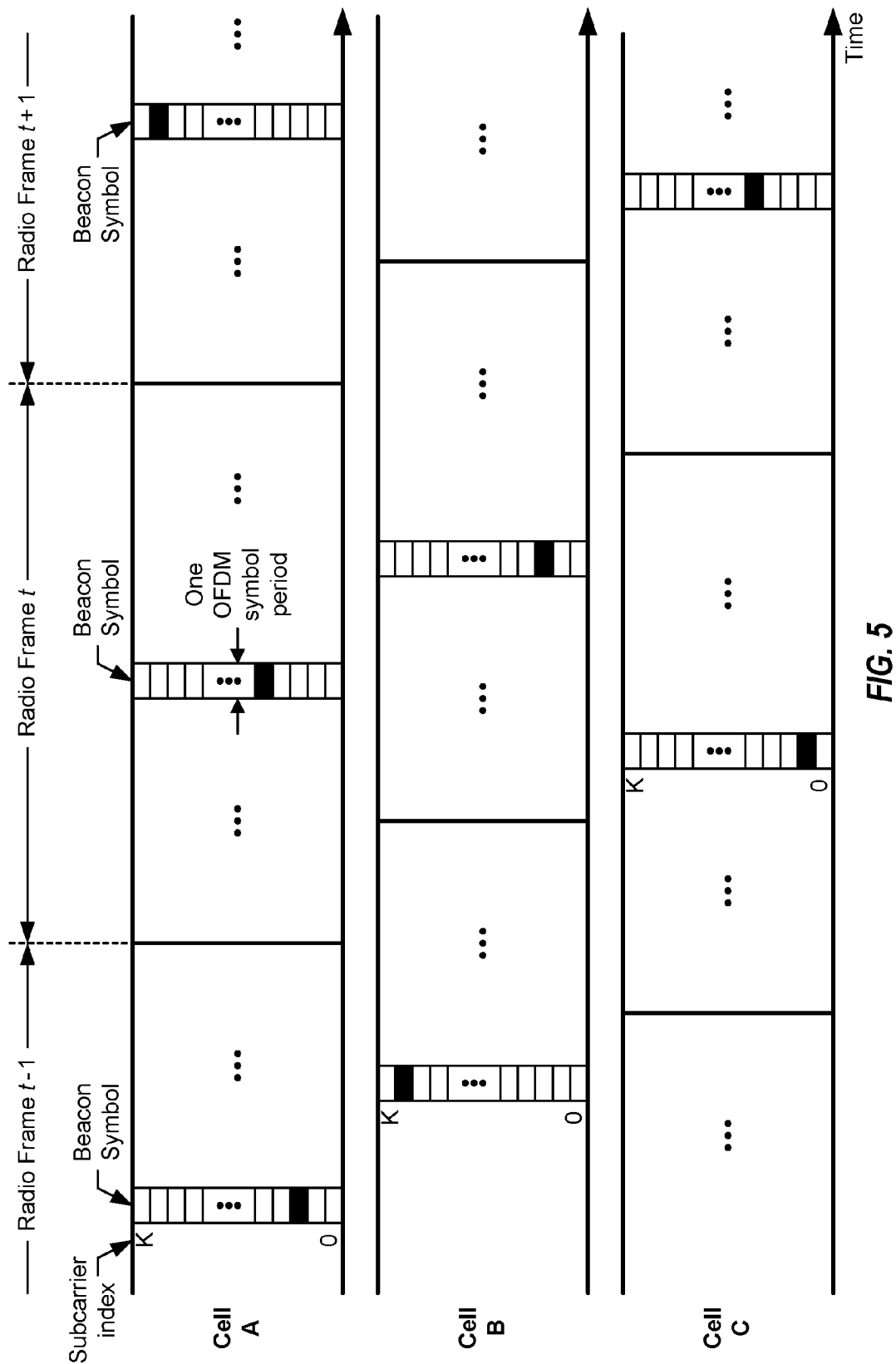
FIG. 5 shows beacon transmission by three asynchronous cells.

FIG. 5 shows example beacon transmission by three cells A, B and C in an asynchronous system. In this design, each cell transmits one beacon symbol in one symbol period of each radio frame, and the three cells may transmit their beacon symbols at different times. Each cell may determine the beacon subcarrier for each beacon symbol based on a beacon pattern for that cell.

In another aspect, the cells in the system may transmit their beacon signals at reduced power levels instead of full power. The transmit power for the beacon signal from each cell may be determined based on various factors such as the target detection probability, the target false alarm probability, etc. Different cells may use different power levels for their beacon signals while still achieving the desired detection performance, e.g., because of different cell sizes, different terrains, etc. The reduced power levels for the beacon signals may reduce interference to adjacent cells, which may improve system performance.

A UE may perform beacon detection in order to search for cells. For beacon detection, the UE may process each received beacon symbol and determine the received power of the U usable subcarriers. If the UE knows the time location of the beacon symbols, then the UE may process only the beacon symbols and ignore all other OFDM symbols. If the UE does not know the time location of the beacon symbols (e.g., in an asynchronous system), then the UE may process each received OFDM symbol. In any case, the UE may detect for cells based on the received power of the usable subcarriers for a sufficient number of beacon symbols.

In a first design, the UE may perform hard decoding for beacon detection as follows:

1. Determine received power of all usable subcarriers for beacon,
2. Detect for candidate subcarriers with high received power, and
3. Identify cells based on the candidate subcarriers.

In a second design, the UE may perform maximal likelihood (ML) decoding for beacon detection as follows:

1. Determine received power of all usable subcarriers for beacon,
2. Combine received power for beacon subcarriers in each beacon pattern, and
3. Identify cells based on the combined received power for all beacon patterns.

For both designs, the UE may first determine the received power of the usable subcarriers. If the cells are synchronous, then the UE may determine symbol timing of the cells, perform OFDM demodulation based on the known cell symbol timing, and determine the received power of the usable subcarriers. If the cells are asynchronous, then the UE may determine the received power of the usable subcarriers in several manners.

Figure 6:
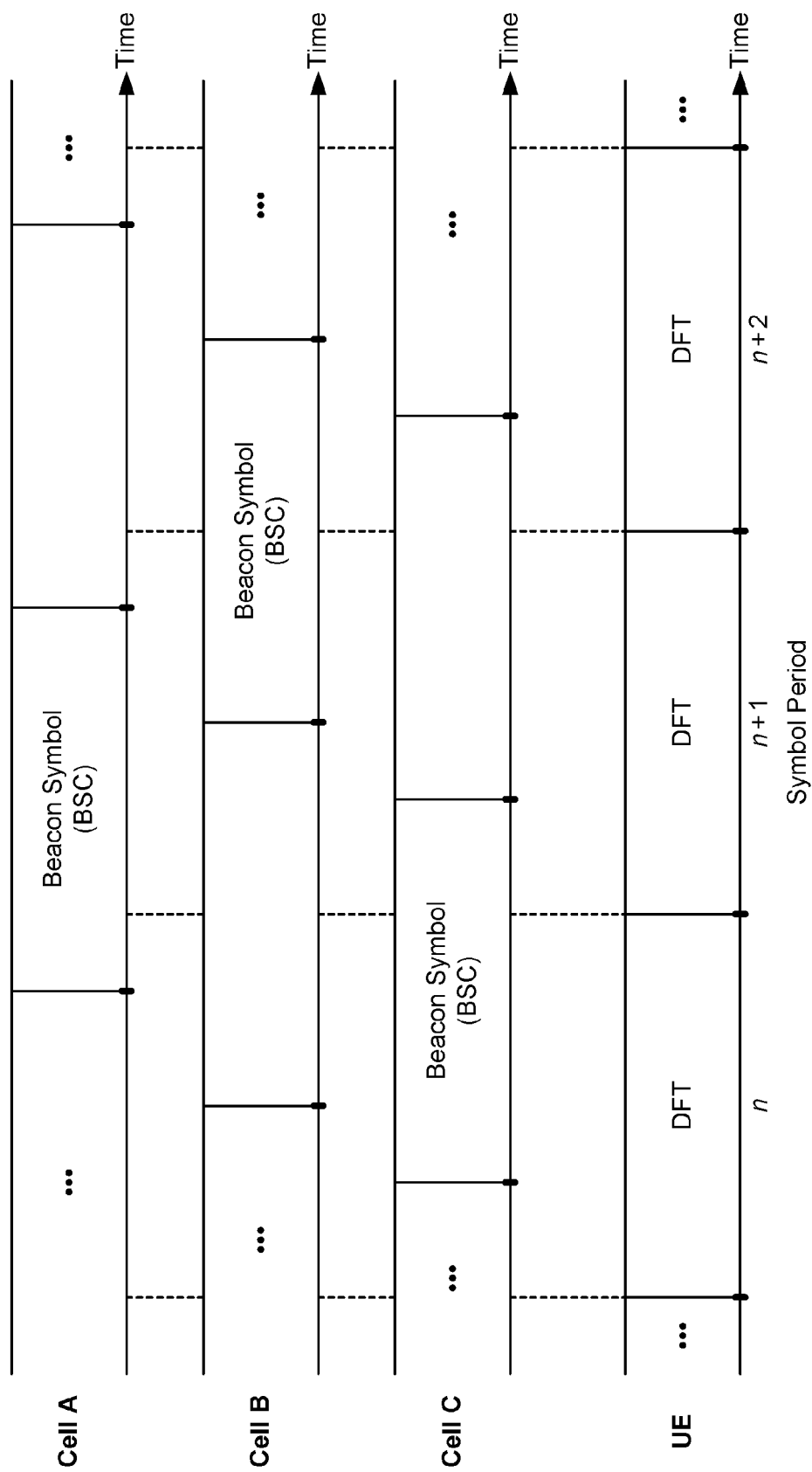
FIG. 6 shows OFDM demodulation in an asynchronous system.

FIG. 6 shows a design of OFDM demodulation by the UE in an asynchronous system. In the example shown in FIG. 6, three cells A, B and C may have different OFDM symbol timing, and the beacon symbols from these cells may not be time aligned at the UE. The UE may attempt to align its OFDM symbol timing to one of the cells, e.g., the serving cell or the strongest cell (not shown in FIG. 6). The UE may also perform OFDM demodulation without attempting to align its OFDM symbol timing to any cell (as shown in FIG. 6). In any case, in each OFDM symbol period n, the UE may perform OFDM demodulation by (i) capturing K received samples and discarding C received samples for the cyclic prefix and (ii) performing a DFT on the K received samples to obtain K received symbols for the K total subcarriers. A DFT may cover a fast Fourier transform (FFT) or some other type of transform.

The UE may compute the received power $P_{k,n}$ of each usable subcarrier k in symbol period n based on the received symbol $R_{k,n}$ for that subcarrier as follows:

$$P_{k,n} = |R_{k,n}|^2. \qquad \text{Eq (3)}$$

As shown in FIG. 6, the OFDM symbol timing at the UE may not be aligned with the beacon symbols of one or more cells. For example, approximately half of the beacon symbol from cell B is captured by the DFT in symbol period n+1, and the remaining beacon symbol is captured by the DFT in symbol period n+2. If the received symbols from only one DFT for either symbol period n+1 or n+2 is used for beacon detection, then up to half of the beacon energy may be lost. Furthermore, the power in the beacon subcarrier may leak to adjacent usable subcarriers. Both of these phenomena may degrade beacon detection performance.

Figure 7:
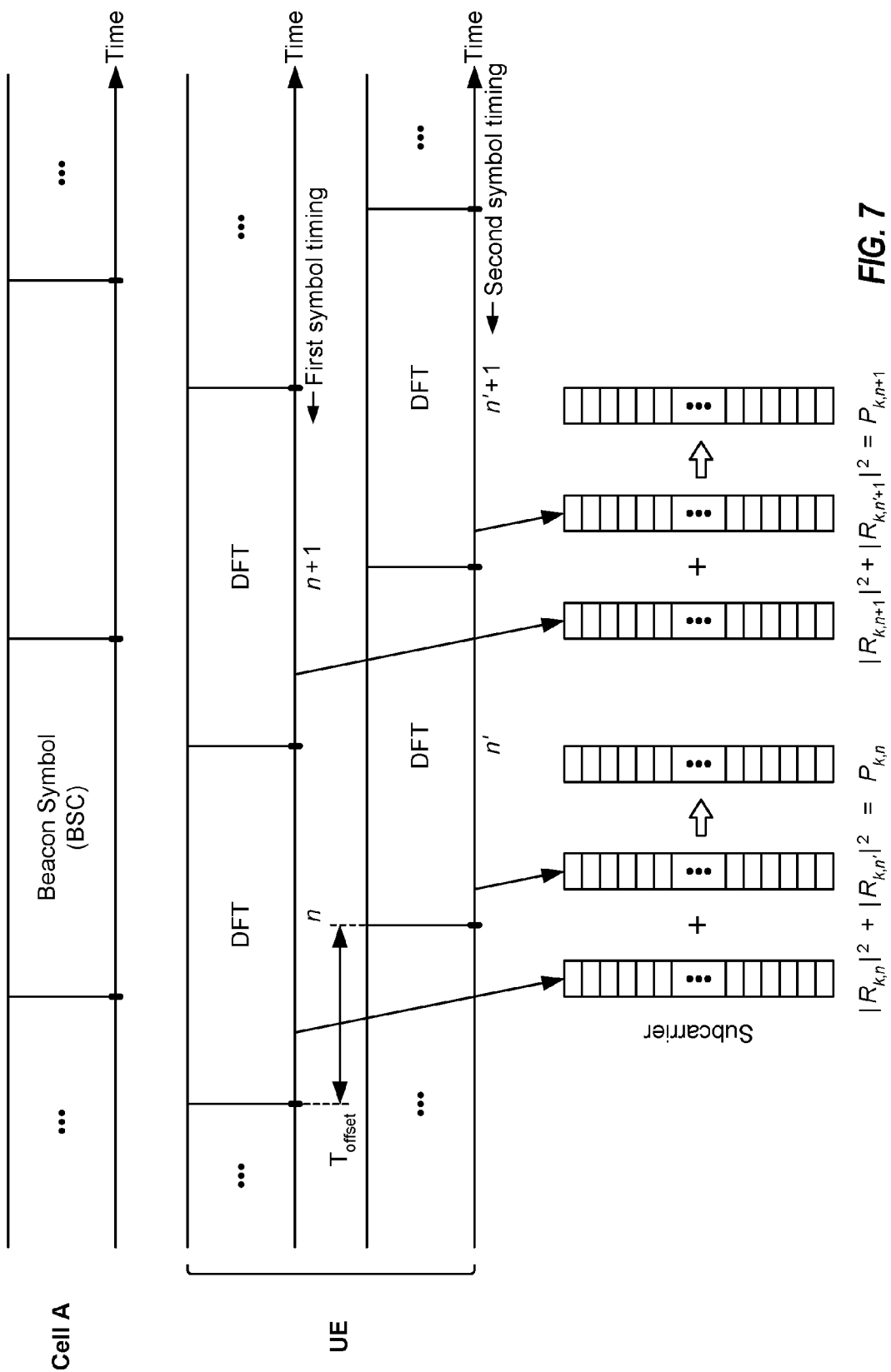
FIG. 7 shows OFDM demodulation with overlapping DFTs.

FIG. 7 shows a design of OFDM demodulation with overlapping DFTs to capture more received power from asynchronous cells. In the design shown in FIG. 7, the UE may perform DFT for each OFDM symbol period based on a first symbol timing, which may be referred to as first DFT or base DFT. The UE may also perform DFT for each OFDM symbol period based on a second symbol timing, which may be referred to as second DFT or additional DFT. The first symbol timing may be arbitrary or based on the timing of the serving cell, the strongest cell, etc. The second symbol timing may be offset from the first symbol timing by $T_{offset}$, which may be a fixed or configurable value. The timing offset $T_{offset}$ may be one half, one quarter, three quarter, or some other fraction of one OFDM symbol period $T_{sym}$.

The UE may obtain received symbols $R_{k,n}$ from the first DFT for symbol period n. The UE may also obtain received symbols $R_{k,n'}$ from the second DFT for symbol period n', which may overlap symbol period n by $T_{sym} - T_{offset}$. The UE may determine the received power $P_{k,n}$ of each usable subcarrier k as follows:

$$P_{k,n} = |R_{k,n}|^2 + |R_{k,n'}|^2. \qquad \text{Eq (4)}$$

The UE may also determine the received power $P_{k,n}$ of each usable subcarrier k by taking the larger of the two DFT outputs, as follows:

$$P_{k,n} = \begin{cases} |R_{k,n'}|^2 & \text{if } |R_{k,n}|^2 > |R_{k,n'}|^2 \\ |R_{k,n'}|^2 & \text{otherwise.} \end{cases} \qquad \text{Eq (5)}$$

The UE may also determine the received power of each usable subcarrier in other manners. For example, a window function may be applied to the received symbols from a usable subcarrier and one or more subcarriers on each side of the usable subcarrier to obtain the received power of the usable subcarrier.

As shown in FIG. 7, by combining the outputs of DFTs with different symbol timing, the UE may be able to capture all or most of the beacon symbol from any cell regardless of the timing offset between the UE and the cell. In the example shown in FIG. 7, all of the beacon symbol from cell A can be captured by the overlapping DFTs for symbol periods n and n'.

In general, the outputs of any number of overlapping DFTs may be non-coherently combined to obtain the received power of the usable subcarriers. The overlapping DFTs may be offset from one another by any amount. Non-coherently combining the overlapping DFT outputs may improve beacon detection performance and mitigate the impact of poor timing alignment between the UE and the cell being detected.

The UE may perform additional DFTs for the second symbol timing in a manner to reduce computational complexity. The UE may perform additional DFTs only when there is reasonable likelihood of capturing a beacon symbol. In one design, the UE may perform the first DFT for each symbol period based on the first symbol timing and may perform additional DFTs for each first DFT with sufficiently strong subcarriers. In another design, the UE may perform additional DFTs in subsequent radio frames when strong subcarriers have been detected by the first DFT. This design may reduce buffering requirements at the UE. In yet another design, the UE may identify symbol periods in which strong subcarriers are detected in a given radio frame and may perform additional DFTs around the identified symbol periods in subsequent radio frames.

For the first design with hard decoding for beacon detection, the UE may first determine the received power of each usable subcarrier in each symbol period, e.g., as shown in equation (3), (4) or (5). The UE may then compare the received power of each usable subcarrier against a threshold $T_{HD}$ and may declare the usable subcarrier as a candidate subcarrier if the received power exceeds the threshold, as follows:

If $P_{k,n} > T_{HD}$, then declare subcarrier k as a candidate subcarrier. $\qquad \text{Eq (6)}$ The UE may divide the received power $P_{k,n}$ by an average power to obtain normalized received power and may then compare the normalized received power against the threshold $T_{HD}$. The average power may be determined across the bandwidth of the beacon, which may be all or a portion of the system bandwidth. Alternatively, the UE may determine the threshold $T_{HD}$ based on the average power and/or other factors such as the target detection probability, the target false alarm probability, etc.

Figure 8:
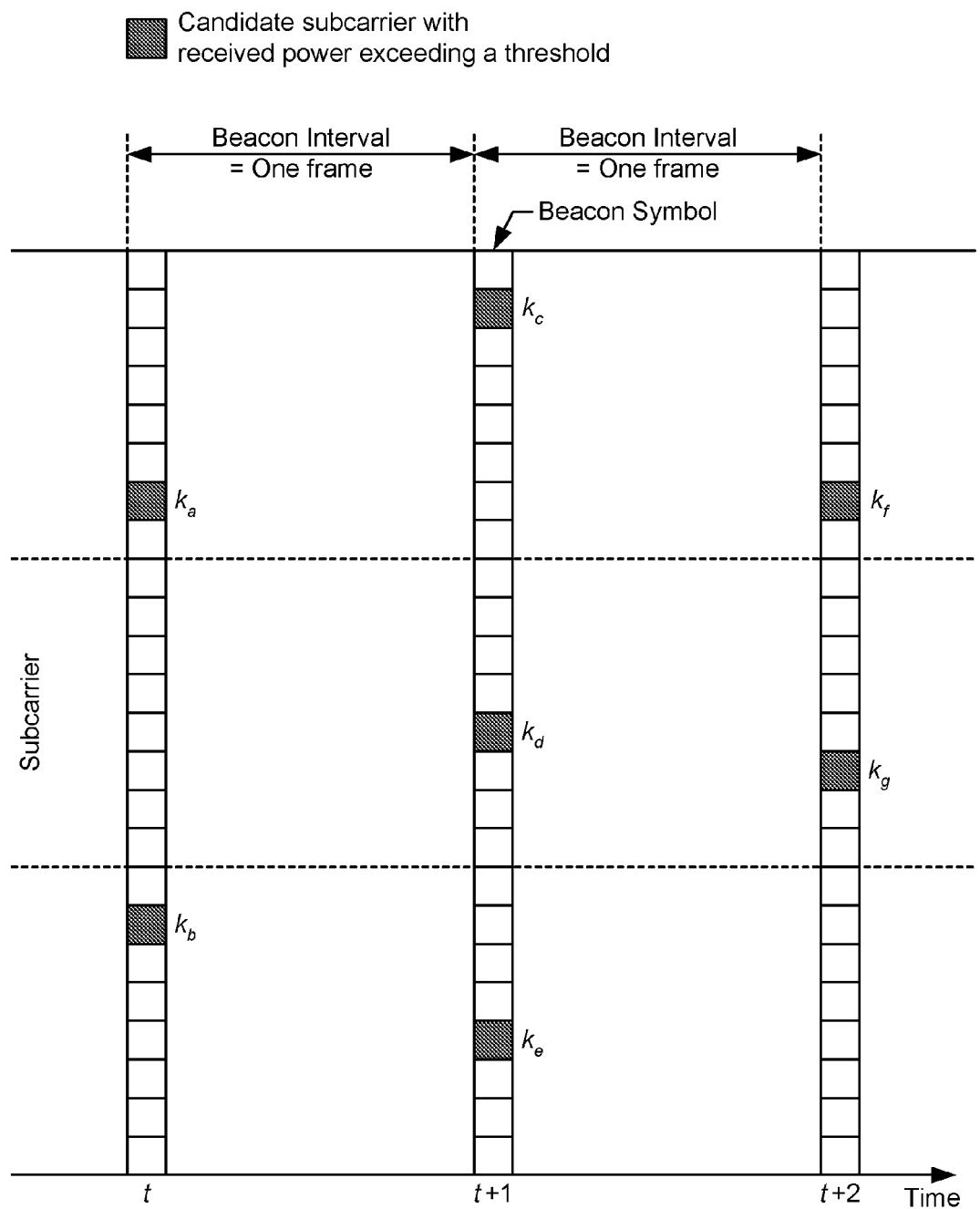
FIG. 8 shows candidate subcarriers for beacon signals from multiple cells.

FIG. 8 shows an example of candidate subcarriers detected by the UE for beacon signals from multiple cells. Each cell may transmit one beacon symbol in the same symbol period of each radio frame. The UE may then detect for cells based on candidate subcarriers in symbol periods spaced apart by one radio frame, as shown in FIG. 8. In general, the UE may obtain any number of candidate subcarriers in each symbol period, and each candidate subcarrier may be any one of the usable subcarriers. The UE may then determine whether the candidate subcarriers match any of the P possible beacon patterns. The detection of beacon patterns based on the candidate subcarriers may be dependent on the manner in which the beacon patterns are defined.

For the design shown in FIG. 3, each beacon pattern may have three beacon subcarriers in three groups in three consecutive radio frames. In this case, for the example shown in FIG. 8, candidate subcarriers $k_b$, $k_d$ and $k_f$ may belong to a beacon pattern, candidate subcarriers $k_a$, $k_e$ and $k_g$ may belong to another (cyclically shifted) beacon pattern, etc. Additional beacon patterns may be detected based on candidate subcarriers for one or more additional radio frames.

For the design shown in equation (1), the UE may perform decoding based on the beacon code used to define the beacon patterns. For simplicity, the UE may obtain just two candidate subcarriers $k_1$ and $k_2$ in two radio frames t and t+1. The candidate subcarriers may be expressed as:

$$k_1 = p_1^{\alpha_1 + Zt} \oplus p_1^{\alpha_2} p_2^{Zt}, \text{ and}$$

$$k_2 = p_1^{\alpha_1 + Z(t+1)} \oplus p_1^{\alpha_2} p_2^{Z(t+1)} = p_1^Z p_1^{\alpha_1 + Zt} \oplus p_2^Z p_1^{\alpha_2} p_2^{Zt}. \qquad \text{Eq (7)}$$

Equation set (7) may be expressed in matrix form as follows:

$$\begin{pmatrix} k_1 \\ k_2 \end{pmatrix} = \begin{pmatrix} 1 & 1 \\ p_1^Z & p_2^Z \end{pmatrix} \begin{pmatrix} p_1^{\alpha_1 + Zt} \\ p_1^{\alpha_2} p_2^{Zt} \end{pmatrix} = \underline{A} \begin{pmatrix} p_1^{\alpha_1 + Zt} \\ p_1^{\alpha_2} p_2^{Zt} \end{pmatrix}, \qquad \text{Eq (8)}$$

where $p_1^Z$ and $p_2^Z$ are equal to two specific elements of field $Z_M$.

The UE may solve for terms $p_1^{\alpha_1 + Zt}$ and $p_1^{\alpha_2} p_2^{Zt}$ in equation (8), as follows:

$$\begin{pmatrix} y_1 \\ y_2 \end{pmatrix} = \underline{A}^{-1} \begin{pmatrix} k_1 \\ k_2 \end{pmatrix} = \begin{pmatrix} p_1^{\alpha_1 + Zt} \\ p_1^{\alpha_2} p_2^{Zt} \end{pmatrix}. \qquad \text{Eq (9)}$$

The UE may obtain the exponent of $p_1^{\alpha_1 + Zt}$ follows:

$$z_1 = \frac{\log(y_1)}{\log(p_1)} = (\alpha_1 + Zt) \bmod M. \qquad \text{Eq (10)}$$

The logarithm in equation (10) is over field $Z_M$, and a given value of y maps to a specific value of z. The exponent factor $\alpha_1$ and time index t may be obtained from equation (10), as follows:

$$\alpha_1 = z_1 \mod Z, \text{ and} \quad \text{Eq (11a)}$$

$$t = z_1 \text{ div } Z. \quad \text{Eq (11b)}$$

Factor $\alpha_2$ may be determined by substituting t obtained from equation (11b) into $y_2 = p_1^{\alpha_2} p_2^{Zt}$ to obtain $p_1^{\alpha_2}$, and then solving for $\alpha_2$ based on $p_1^{\alpha_2}$. The cell ID may then be determined based on factors $\alpha_1$ and $\alpha_2$, as shown in equation (2).

The UE can also detect multiple cells based on candidate subcarriers for more than two radio frames. In the example shown in FIG. 8, the UE may determine factors $\alpha_1$ and $\alpha_2$ for candidate subcarriers $k_a$ and $k_c$ in radio frames t and t+1 and may then determine the beacon pattern for factors $\alpha_1$ and $\alpha_2$. The UE may next verify that this beacon pattern is present using candidate subcarriers $k_f$ and $k_g$ in the next radio frame. The UE may repeat this process for each possible pair of candidate subcarriers in radio frames t and t+1.

For the second design with maximal likelihood decoding for beacon detection, the UE may first determine the received power of each usable subcarrier in each symbol period, e.g., as shown in equation (3), (4) or (5). For each possible beacon pattern x, the UE may combine the received power of usable subcarriers corresponding to the beacon subcarriers for that beacon pattern, as follows:

$$P_x = \sum_{k,t \in X} P_{k,t} \cdot \beta_{k,t}, \quad \text{Eq (12)}$$

where $P_{k,t}$ is the received power of usable subcarrier k in radio frame t, $\beta_{k,t}$ is a scaling factor for usable subcarrier k in radio frame t, X is a function that identifies the beacon subcarriers for beacon pattern x, and $P_x$ is the combined received power for beacon pattern x.

The UE may combine the received power of usable subcarriers across a sufficient number of radio frames. The UE may scale the received power $P_{k,t}$ with a scaling factor $\beta_{k,t}$, which may be dependent on the average power and/or other factors. The scaling factor $\beta_{k,t}$ may also be omitted by setting it to 1.

The UE may obtain P combined received power for the P possible beacon patterns. The UE may compare the combined received power for each possible beacon pattern against a threshold $T_{ML}$ and may declare a detected beacon pattern if the combined received power exceeds the threshold, as follows:

If $P_x > T_{ML}$, then declare beacon pattern/cell x is detected. Eq (13)

The threshold $T_{ML}$ may be selected to obtain the target detection probability, the target false alarm probability, etc. A lower value for $T_{ML}$ may increase the likelihood of detecting cells but may also increase the likelihood of erroneously declaring cells that are not actually present.

The maximal likelihood decoding described above may be performed for each symbol period in which strong subcarriers are detected. In equation (12), the received power $P_{k,t}$ for a specific symbol period n of different radio frames are combined. The combining in equation (12) and the threshold comparison in equation (13) may be repeated for each additional symbol period (e.g., n+1, n+2, etc.) to detect for beacon patterns with different symbol timing.

More than one beacon pattern may be detected for a given symbol period based on equation (13). In this case, more than one cell may be declared as detected based on the detected beacon patterns. Alternatively, the detected beacon pattern with the largest combined received power may be identified, and only the cell associated with this beacon pattern may be declared as detected.

Figure 9:
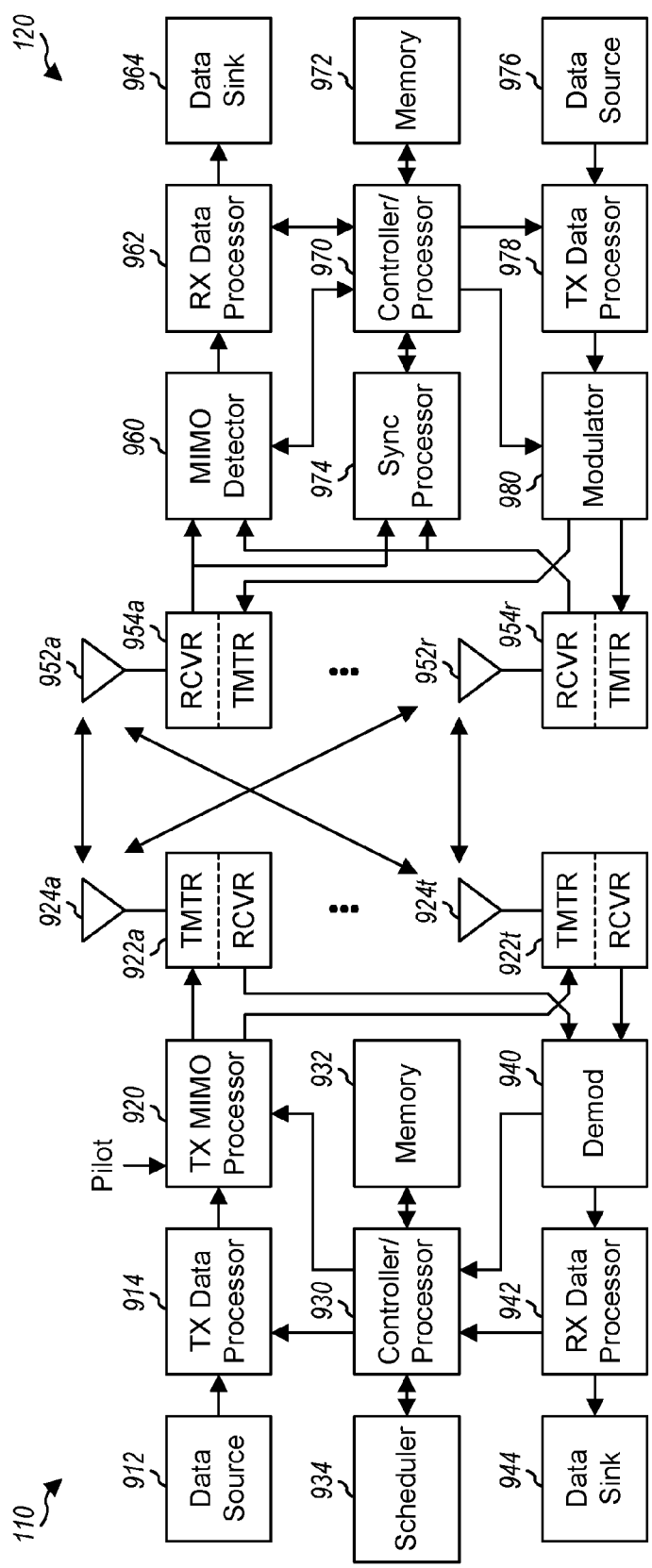
FIG. 9 shows a block diagram of a Node B and a UE.

FIG. 9 shows a block diagram of a design of Node B 110 and UE 120, which are one of the Node Bs and one of the UEs in FIG. 1. At Node B 110, a transmit (TX) data processor 914 may receive traffic data for one or more UEs from a data source 912. TX data processor 914 may process (e.g., format, encode, and interleave) the traffic data for each UE based on one or more coding schemes selected for that UE to obtain coded data. TX data processor 914 may then modulate (or symbol map) the coded data for each UE based on one or more modulation schemes (e.g., BPSK, QSPK, PSK or QAM) selected for that UE to obtain modulation symbols.

A TX MIMO processor 920 may multiplex the modulation symbols for all UEs with pilot symbols using any multiplexing scheme. TX MIMO processor 920 may process (e.g., precode) the multiplexed modulation symbols and pilot symbols and provide T output symbol streams to T transmitters (TMTR) 922a through 922t. Each transmitter 922 may process a respective output symbol stream (e.g., for OFDM) to obtain an output chip stream. Each transmitter 922 may further process (e.g., convert to analog, amplify, filter, and upconvert) the output chip stream to obtain a downlink signal. T downlink signals from transmitters 922a through 922t may be transmitted via T antennas 924a through 924t, respectively.

At UE 120, antennas 952a through 952r may receive the downlink signals from Node B 110 and provide received signals to receivers (RCVR) 954a through 954r, respectively. Each receiver 954 may condition (e.g., filter, amplify, downconvert, and digitize) a respective received signal to obtain samples and may further process the samples (e.g., for OFDM) to obtain received symbols. A MIMO detector 960 may obtain received symbols from all R receivers 954a through 954r. MIMO detector 960 may process the received symbols based on a MIMO receiver processing technique to obtain detected symbols, which are estimates of the modulation symbols transmitted by Node B 110. A receive (RX) data processor 962 may then process (e.g., demodulate, deinterleave, and decode) the detected symbols and provide decoded data for UE 120 to a data sink 964.

On the uplink, at UE 120, traffic data from a data source 976 and signaling may be processed by a TX data processor 978, further processed by a modulator 980, conditioned by transmitters 954a through 954r, and transmitted to Node B 110. At Node B 110, the uplink signals from UE 120 may be received by antennas 924, conditioned by receivers 922, demodulated by a demodulator 940, and processed by an RX data processor 942 to obtain the traffic data and signaling transmitted by UE 120.

Controllers/processors 930 and 970 may direct the operation at Node B 110 and UE 120, respectively. Memories 932 and 972 may store data and program codes for Node B 110 and UE 120, respectively. A synchronization (Sync) processor 974 may perform beacon detection and provide cell IDs and other information for detected cells. A scheduler 934 may schedule UEs for downlink and/or uplink transmission.

Figure 10:
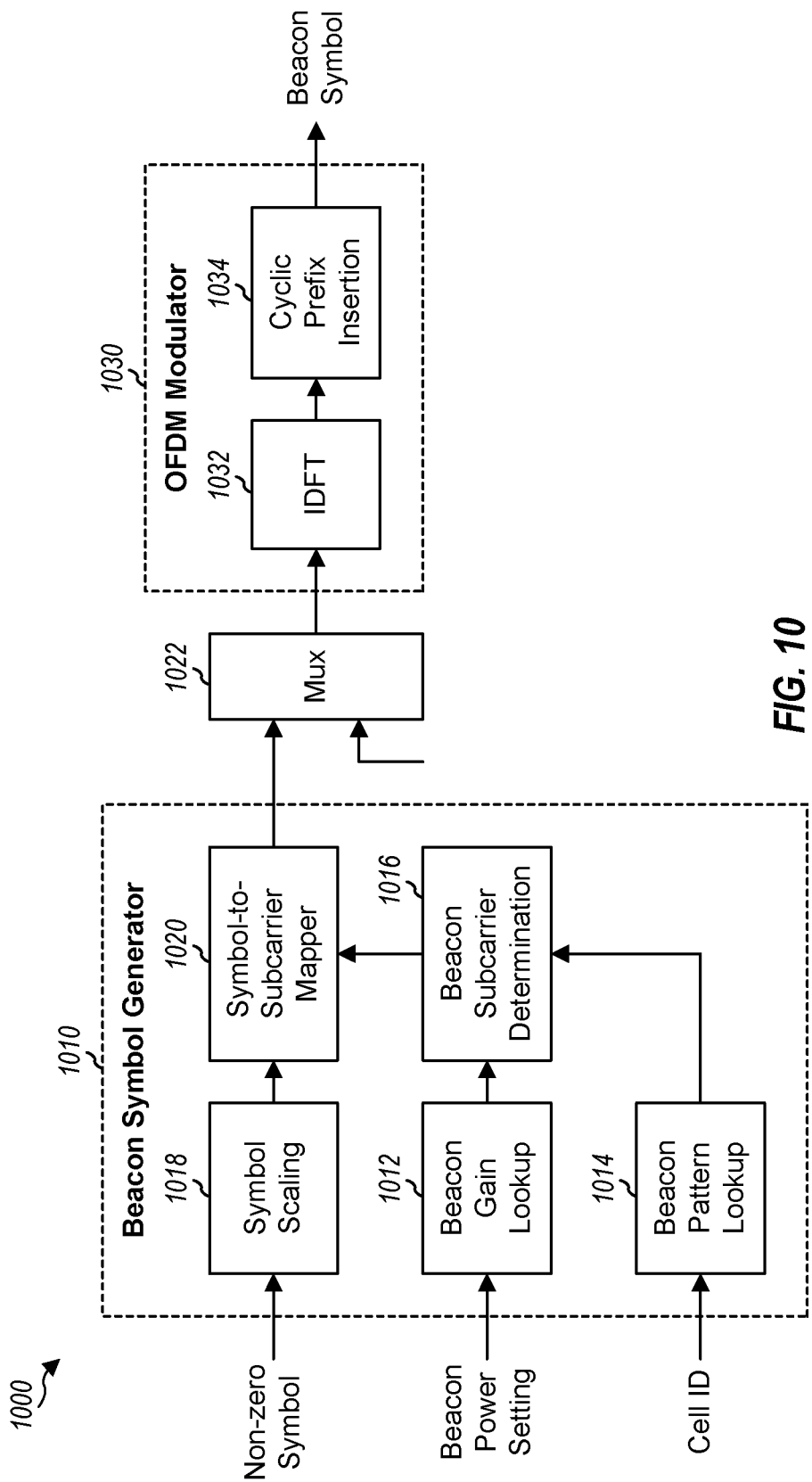
FIG. 10 shows a block diagram of a beacon signal generator at the Node B.

FIG. 10 shows a block diagram of a design of a beacon signal generator 1000, which includes a beacon symbol generator 1010 and an OFDM modulator 1030. Generator 1010 may be part of TX data processor 914 at Node B 110, and OFDM modulator 1030 may be part of each transmitter 922.

Within beacon symbol generator 1010, a unit 1012 may receive a beacon power setting for a cell and may determine a gain $G_b$ for a beacon signal. A unit 1014 may receive a cell ID and/or other information and determine a beacon pattern based on the received information. For each beacon symbol, a unit 1016 may determine a beacon subcarrier based on the beacon pattern. For each beacon symbol, a scaling unit 1018 may scale a non-zero symbol (which has a non-zero signal value) based on the gain $G_b$. A mapper 1020 may map the scaled non-zero symbol to the beacon subcarrier and may map zero symbols (with signal value of zero) to remaining subcarriers in the beacon signal bandwidth. A multiplexer (Mux) 1022 may multiplex the symbols from generator 1010 with other symbols to be transmitted.

Within OFDM modulator 1030, an inverse DFT (IDFT) unit 1032 may perform an IDFT on K symbols from multiplexer 1022 for each beacon symbol period and provide K time-domain samples. A cyclic prefix insertion unit 1034 may append a cyclic prefix to the K time-domain samples and provide a beacon symbol.

Figure 11:
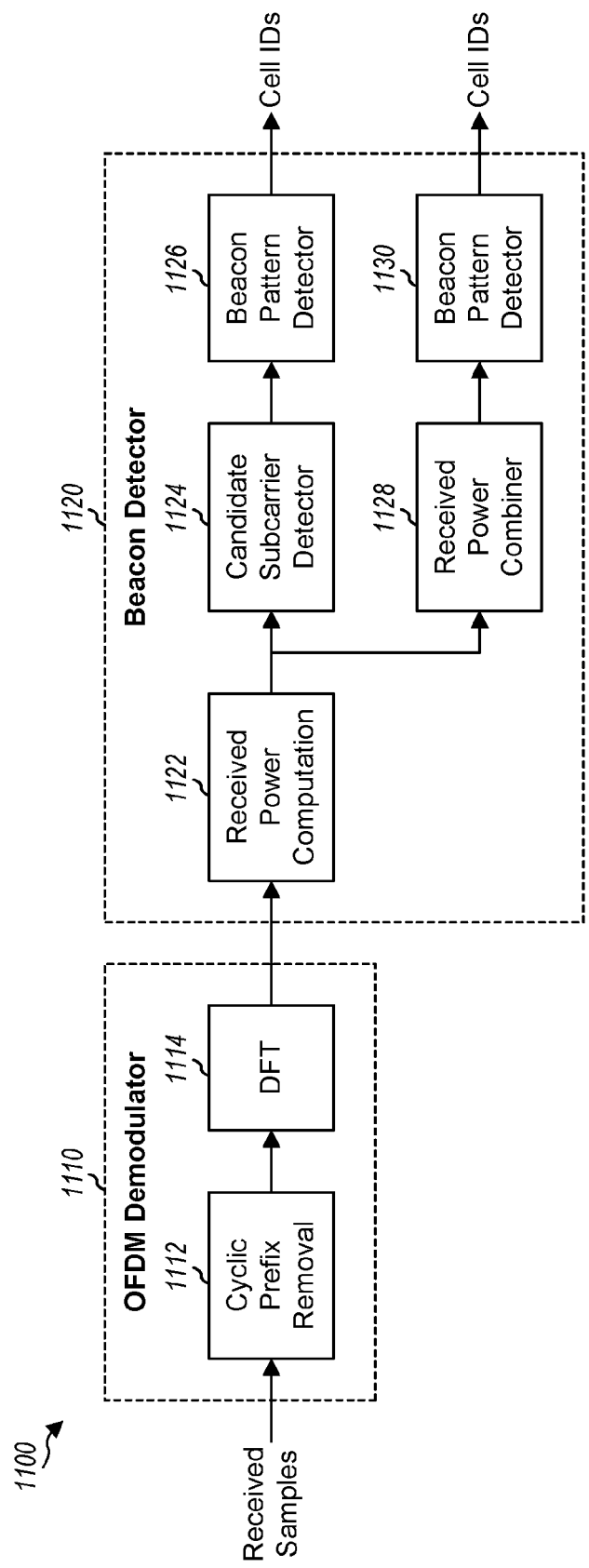
FIG. 11 shows a block diagram of a beacon processor at the UE.

FIG. 11 shows a block diagram of a design of a beacon processor 1100, which includes an OFDM demodulator 1110 and a beacon detector 1120. OFDM demodulator 1110 may be part of each receiver 954 at UE 120, and beacon detector 1120 may be part of sync processor 974.

Within OFDM demodulator 1110, a cyclic prefix removal unit 1112 may remove the cyclic prefix in each received OFDM symbol and provide K received samples. A DFT unit 1114 may perform a DFT on the K received samples and provide K received symbols. Units 1112 and 1114 may perform non-overlapping DFTs (e.g., as shown in FIG. 6) or overlapping DFTs (e.g., as shown in FIG. 7).

Within beacon detector 1120, a unit 1122 may compute the received power of each usable subcarrier, e.g., as shown in equation (3), (4) or (5). Detector 1120 may perform beacon detection based on hard decoding and/or maximal likelihood decoding. For hard decoding, a unit 1124 may determine candidate subcarriers based on the received power of the usable subcarriers, e.g., as shown in equation (6). A beacon pattern detector 1126 may then detect for cells based on the candidate subcarriers and the beacon patterns for all possible cell IDs. For maximal likelihood decoding, a unit 1128 may combine the received power of beacon subcarriers for each possible beacon pattern, e.g., as shown in equation (12). Detector 1126 may then detect for cells based on the combined received power for each possible beacon pattern, e.g., as shown in equation (13).

FIG. 12 shows a design of a process 1200 for processing a beacon signal in a wireless communication system. A beacon pattern for a cell may be determined, with the beacon pattern identifying multiple subcarriers to use for a beacon signal in multiple symbol periods, and each of the multiple subcarriers being from a different one of multiple orthogonal groups of subcarriers (block 1212). For example, the beacon pattern may identify a first subcarrier in a first group, a second subcarrier in a second group, a third subcarrier in a third group, etc. The multiple groups of subcarriers may correspond to different non-overlapping subsets of all subcarriers usable for beacon. G groups of subcarriers may each include S subcarriers, and P beacon patterns may be defined based on the G groups of S subcarriers, where $P=S^G$.

Processing may be performed for the beacon signal based on the beacon pattern (block 1214). Process 1200 may be performed by a Node B or a transmitter. In this case, for block 1214, a first beacon symbol may be generated based on the first subcarrier in the first group and sent in a first symbol period. A second beacon symbol may be generated based on the second subcarrier in the second group and sent in a second symbol period. A third beacon symbol may be generated based on the third subcarrier in the third group and sent in a third symbol period.

Process 1200 may also be performed by a UE or a receiver. In this case, for block 1214, received power of subcarriers usable for beacon may be determined. The cell may then be detected based on the received power of the usable subcarriers and the beacon pattern. For hard decoding, candidate subcarriers may be determined based on the received power of the usable subcarriers, and the cell may be detected based on the candidate subcarriers and the beacon pattern. For maximal likelihood decoding, received power of subcarriers determined based on the beacon pattern may be combined, and the cell may be detected based on the combined received power.

FIG. 13 shows a design of an apparatus 1300 for processing a beacon signal. Apparatus 1300 includes means for determining a beacon pattern for a cell, with the beacon pattern identifying multiple subcarriers to use for a beacon signal in multiple symbol periods, and each of the multiple subcarriers being from a different one of multiple orthogonal groups of subcarriers (module 1312), and means for performing processing for the beacon signal based on the beacon pattern (module 1314).

FIG. 14 shows a design of a process 1400 for transmitting beacon in a wireless communication system. A transmit power level for a beacon signal from a cell may be determined, with the transmit power level being configurable for the cell and potentially different from transmit power levels for beacon signals from neighboring cells (block 1412). The transmit power level may be determined based on a target detection probability, a target false alarm probability, and/or other factors. The beacon signal may be generated for transmission at the determined transmit power level (block 1414). For block 1414, a beacon symbol may be generated for each symbol period in which the beacon signal is transmitted. The beacon symbol may have a non-zero symbol for one subcarrier and zero symbols for remaining subcarriers, with the non-zero symbol being transmitted at the determined transmit power level.

FIG. 15 shows a design of an apparatus 1500 for transmitting beacon in a wireless communication system. Apparatus 1500 includes means for determining a transmit power level for a beacon signal from a cell, with the transmit power level being configurable for the cell and potentially different from transmit power levels for beacon signals from neighboring cells (module 1512), and means for generating the beacon signal for transmission at the determined transmit power level (module 1514).

Figures 16, 17:
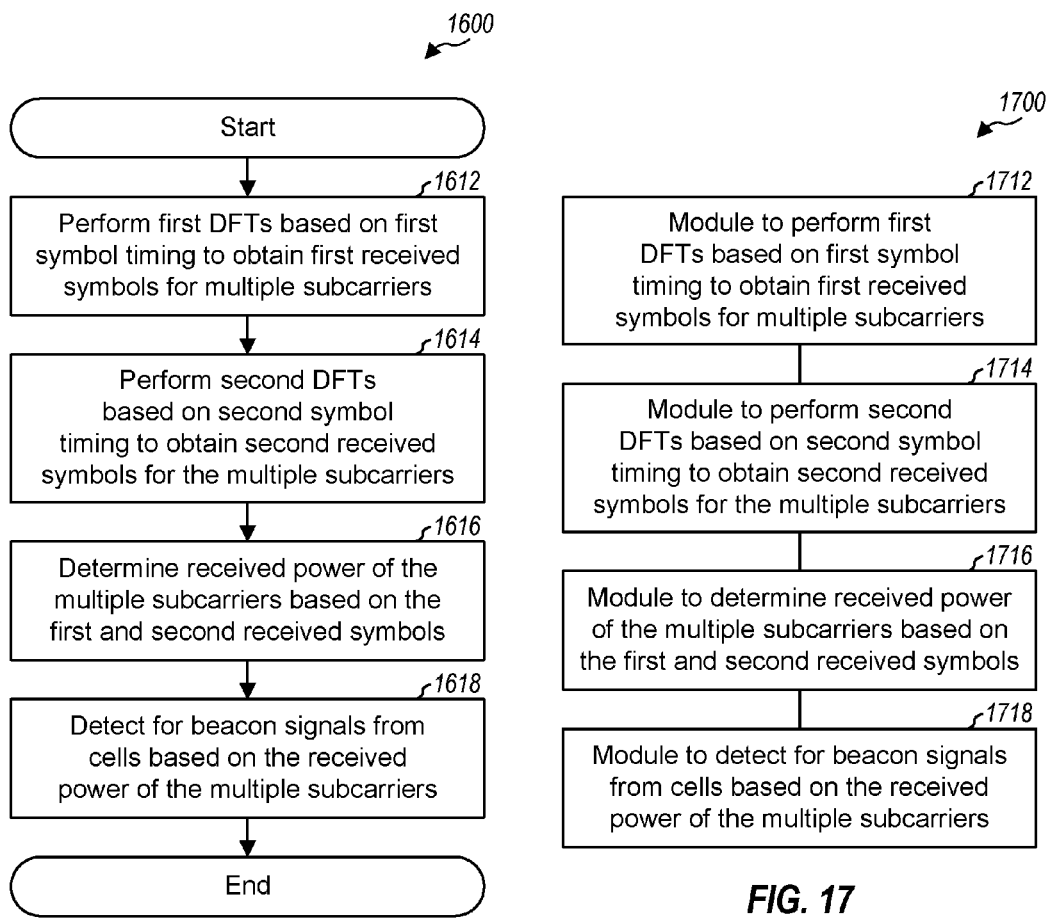
FIGS. 16 and 17 show a process and an apparatus, respectively, for beacon detection by the UE.

FIG. 16 shows a design of a process 1600 for beacon detection by a UE or a receiver. First DFTs may be performed based on first symbol timing to obtain first received symbols for multiple subcarriers (block 1612). Second DFTs may be performed based on second symbol timing to obtain second received symbols for the multiple subcarriers (block 1614). The second symbol timing may be offset from the first symbol timing by either a predetermined fraction or a configurable fraction of a symbol period. Received power of the multiple subcarriers may be determined based on the first and second received symbols (block 1616). Beacon signals from cells may be detected based on the received power of the multiple subcarriers (block 1618).

For block 1616, received power of the first received symbols from each first DFT may be determined, and received power of the second received symbols from each second DFT may also be determined. The received power of the multiple subcarriers may be determined by combining (or taking the larger of) the received power of the first received symbols and the received power of the second received symbols from overlapping first and second DFTs. For block 1618, hard decoding or maximal likelihood decoding may be performed. For hard decoding, candidate subcarriers may be determined based on the received power of the multiple subcarriers, and the beacon signals may be detected based on the candidate subcarriers and the beacon patterns for the cells. For maximal likelihood decoding, received power of subcarriers for each possible beacon pattern may be combined, and the cells may be detected based on the combined received power for each of the multiple beacon patterns. The beacon patterns for the cells may be defined based on orthogonal groups of subcarriers or based on at least one of a beacon code, a Reed-Solomon code, an MDS code, and a comma free code.

To reduce the number of DFTs, whether to perform the second DFTs may be determined based on the outputs of the first DFTs. The second DFTs may be performed for symbol periods in which strong subcarriers are likely to be present and may be skipped otherwise.

FIG. 17 shows a design of an apparatus 1700 for beacon detection. Apparatus 1700 includes means for performing first DFTs based on first symbol timing to obtain first received symbols for multiple subcarriers (module 1712), means for performing second DFTs based on second symbol timing to obtain second received symbols for the multiple subcarriers (module 1714), means for determining received power of the multiple subcarriers based on the first and second received symbols (module 1716), and means for detecting for beacon signals from cells based on the received power of the multiple subcarriers (module 1718).

FIG. 18 shows a design of a process 1800 for beacon detection with maximal likelihood decoding. Received power of multiple subcarriers usable for beacon signals may be determined (block 1812). Received power of subcarriers for each of multiple beacon patterns may be combined (block 1814). Cells may be detected based on the combined received power for each of the multiple beacon patterns (block 1816).

For block 1812, first DFTs may be performed based on first symbol timing to obtain first received symbols for the multiple subcarriers. The received power of the multiple subcarriers may be determined based on the first received symbols, e.g., as shown in equation (3). Second DFTs may also be performed based on second symbol timing to obtain second received symbols for the multiple subcarriers. The received power of the multiple subcarriers may then be determined based further on the second received symbols, e.g., as shown in equation (4) or (5).

For block 1816, the combined received power for each beacon pattern may be compared against a threshold. A detected cell may be declared for each beacon pattern with combined received power exceeding the threshold. Alternatively, the largest combined received power among all beacon patterns may be determined. A detected cell may then be declared if the largest combined received power exceeds the threshold.

FIG. 19 shows a design of an apparatus 1900 for beacon detection. Apparatus 1900 includes means for determining received power of multiple subcarriers usable for beacon signals (module 1912), means for combining received power of subcarriers for each of multiple beacon patterns (module 1914), and means for detecting for cells based on the combined received power for each of the multiple beacon patterns (module 1916).

The modules in FIGS. 13, 15, 17 and 19 may comprise processors, electronics devices, hardware devices, electronics components, logical circuits, memories, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising:
   at least one processor configured to determine a beacon pattern for a cell and to perform processing for a beacon signal based on the beacon pattern, the beacon pattern identifying multiple subcarriers to use for the beacon signal in multiple symbol periods, each of the multiple subcarriers being from a different one of multiple orthogonal groups of subcarriers; and
   a memory coupled to the at least one processor,
   wherein the multiple (G) orthogonal groups of subcarriers each include multiple (S) subcarriers, and wherein multiple (P) beacon patterns are defined based on the G orthogonal groups of S subcarriers, where P is equal to S raised to the power of G.

2. The apparatus of claim 1, wherein the beacon pattern identifies a first subcarrier in a first group and a second subcarrier in a second group, and wherein the at least one processor is configured to generate a first beacon symbol based on the first subcarrier in the first group, to generate a second beacon symbol based on the second subcarrier in the second group, to send the first beacon symbol in a first symbol period, and to send the second beacon symbol in a second symbol period.

3. The apparatus of claim 2, wherein the beacon pattern further identifies a third subcarrier in a third group, and wherein the at least one processor is further configured to generate a third beacon symbol based on the third subcarrier in the third group, and to send the third beacon symbol in a third symbol period.

4. The apparatus of claim 1, wherein the at least one processor is configured to determine received power of subcarriers usable for beacon, and to detect for the cell based on the received power of the subcarriers usable for beacon and the beacon pattern.

5. The apparatus of claim 4, wherein the at least one processor is configured to determine candidate subcarriers based on the received power of the subcarriers usable for beacon, and to detect for the cell based on the candidate subcarriers and the beacon pattern.

6. The apparatus of claim 4, wherein the at least one processor is configured to combine received power of subcarriers identified by the beacon pattern, and to detect for the cell based on the combined received power.

7. The apparatus of claim 1, wherein the multiple orthogonal groups of subcarriers correspond to different non-overlapping subsets of all subcarriers usable for beacon.

8. The apparatus of claim 1, wherein the beacon pattern identifies three subcarriers to use for the beacon signal in three symbol periods, each of the three subcarriers being from a different one of three orthogonal groups of subcarriers.

9. A method for wireless communication, comprising:
   determining a beacon pattern for a cell, the beacon pattern identifying multiple subcarriers to use for a beacon signal in multiple symbol periods, each of the multiple subcarriers being from a different one of multiple orthogonal groups of subcarriers; and
   performing processing for the beacon signal based on the beacon pattern,
   wherein the multiple (G) orthogonal groups of subcarriers each include multiple (S) subcarriers, and wherein multiple (P) beacon patterns are defined based on the G orthogonal groups of S subcarriers, where P is equal to S raised to the power of G.

10. The method of claim 9, wherein the beacon pattern identifies a first subcarrier in a first group and a second subcarrier in a second group, and wherein the performing processing for the beacon signal comprises
    generating a first beacon symbol based on the first subcarrier in the first group,
    generating a second beacon symbol based on the second subcarrier in the second group,
    sending the first beacon symbol in a first symbol period, and
    sending the second beacon symbol in a second symbol period.

11. The method of claim 9, wherein the performing processing for the beacon signal comprises
    determining received power of subcarriers usable for beacon, and
    detecting for the cell based on the received power of the subcarriers usable for beacon and the beacon pattern.

12. An apparatus for wireless communication, comprising:
    means for determining a beacon pattern for a cell, the beacon pattern identifying multiple subcarriers to use for a beacon signal in multiple symbol periods, each of the multiple subcarriers being from a different one of multiple orthogonal groups of subcarriers; and
    means for performing processing for the beacon signal based on the beacon pattern,
    wherein the multiple (G) orthogonal groups of subcarriers each include multiple (S) subcarriers, and wherein multiple (P) beacon patterns are defined based on the G orthogonal groups of S subcarriers, where P is equal to S raised to the power of G.

13. The apparatus of claim 12, wherein the beacon pattern identifies a first subcarrier in a first group and a second subcarrier in a second group, and wherein the means for performing processing for the beacon signal comprises means for generating a first beacon symbol based on the first subcarrier in the first group, means for generating a second beacon symbol based on the second subcarrier in the second group, means for sending the first beacon symbol in a first symbol period, and means for sending the second beacon symbol in a second symbol period.

14. The apparatus of claim 12, wherein the means for performing processing for the beacon signal comprises means for determining received power of subcarriers usable for beacon, and means for detecting for the cell based on the received power of the subcarriers usable for beacon and the beacon pattern.

15. A non-transitory machine-readable medium comprising instructions which, when executed by a machine, cause the machine to perform operations including:

determining a beacon pattern for a cell, the beacon pattern identifying multiple subcarriers to use for a beacon signal in multiple symbol periods, each of the multiple subcarriers being from a different one of multiple orthogonal groups of subcarriers; and performing processing for the beacon signal based on the beacon pattern, wherein the multiple (G) orthogonal groups of subcarriers each include multiple (S) subcarriers, and wherein multiple (P) beacon patterns are defined based on the G orthogonal groups of S subcarriers, where P is equal to S raised to the power of G.

16. An apparatus for wireless communication, comprising:

at least one processor configured to determine a transmit power level for a beacon signal from a cell and to generate the beacon signal for transmission at the determined transmit power level, the transmit power level being configurable for the cell and different from transmit power levels for beacon signals from neighboring cells, the beacon signal from the cell being based on a beacon pattern identifying multiple subcarriers to use for the beacon signal in multiple symbol periods, each of the multiple subcarriers being from a different one of multiple orthogonal groups of subcarriers, wherein the multiple (G) orthogonal groups of subcarriers each include multiple (S) subcarriers, and wherein multiple (P) beacon patterns are defined based on the G orthogonal groups of S subcarriers, where P is equal to S raised to the power of G; and a memory coupled to the at least one processor.

17. The apparatus of claim 16, wherein the at least one processor is configured to generate a beacon symbol for each symbol period in which the beacon signal is transmitted, the beacon symbol having a non-zero symbol for one subcarrier and zero symbols for remaining subcarriers, the non-zero symbol being transmitted at the determined transmit power level.

18. The apparatus of claim 16, wherein the at least one processor is configured to determine the transmit power level based on a target detection probability and a target false alarm probability for the beacon signal.

19. A method for wireless communication, comprising:

determining a transmit power level for a beacon signal from a cell, the transmit power level being configurable for the cell and different from transmit power levels for beacon signals from neighboring cells; and generating the beacon signal for transmission at the determined transmit power level, the beacon signal from the cell being based on a beacon pattern identifying multiple subcarriers to use for the beacon signal in multiple symbol periods, each of the multiple subcarriers being from a different one of multiple orthogonal groups of subcarriers, wherein the multiple (G) orthogonal groups of subcarriers each include multiple (S) subcarriers, and wherein multiple (P) beacon patterns are defined based on the G orthogonal groups of S subcarriers, where P is equal to S raised to the power of G.

20. The method of claim 19, wherein the generating the beacon signal comprises generating a beacon symbol for each symbol period in which the beacon signal is transmitted, the beacon symbol having a non-zero symbol for one subcarrier and zero symbols for remaining subcarriers, the non-zero symbol being transmitted at the determined transmit power level.

21. An apparatus for wireless communication, comprising:

at least one processor configured to perform first discrete Fourier transforms (DFTs) based on first symbol timing to obtain first received symbols for multiple subcarriers, to perform second DFTs based on second symbol timing to obtain second received symbols for the multiple subcarriers, to determine received power of the multiple subcarriers based on the first and second received symbols, and to detect for beacon signals from cells based on the received power of the multiple subcarriers; and a memory coupled to the at least one processor, wherein the at least one processor is configured to determine candidate subcarriers based on the received power of the multiple subcarriers, and to detect for the beacon signals based on the candidate subcarriers and beacon patterns for the cells, wherein the beacon patterns for the cells are defined based on multiple orthogonal groups of subcarriers, and wherein the multiple (G) orthogonal groups of subcarriers each include the multiple (S) subcarriers, and wherein multiple (P) beacon patterns are defined based on the G orthogonal groups of S subcarriers, where P is equal to S raised to the power of G.

22. The apparatus of claim 21, wherein the at least one processor is configured to determine received power of the first received symbols from each first DFT, to determine received power of the second received symbols from each second DFT, and to combine the received power of the first and second received symbols from overlapping first and second DFTs to obtain the received power of the multiple subcarriers.

23. The apparatus of claim 21, wherein the at least one processor is configured to determine received power of the first received symbols from each first DFT, to determine received power of the second received symbols from each second DFT, and to use larger of the received power of the first received symbols and the received power of the second received symbols from overlapping first and second DFTs as the received power of the multiple subcarriers.

24. The apparatus of claim 21, wherein the beacon patterns for the cells are defined based on at least one of a beacon code, a Reed-Solomon code, a maximum distance separable (MDS) code, and a comma free code.

25. The apparatus of claim 21, wherein the at least one processor is configured to combine received power of subcarriers for each of the multiple beacon patterns, and to detect for the cells based on the combined received power for each of the multiple beacon patterns.

26. The apparatus of claim 21, wherein the second symbol timing is offset from the first symbol timing by a configurable fraction of a symbol period.

27. The apparatus of claim 21, wherein the at least one processor is configured to determine whether to perform the second DFTs based on outputs of the first DFTs.

28. The apparatus of claim 21, wherein the at least one processor is configured to perform the second DFTs for symbol periods in which strong subcarriers are likely to be present, and to skip the second DFTs for symbol periods in which strong subcarriers are unlikely to be present.

29. A method for wireless communication, comprising:
performing first discrete Fourier transforms (DFTs) based on first symbol timing to obtain first received symbols for multiple subcarriers;
performing second DFTs based on second symbol timing to obtain second received symbols for the multiple subcarriers;
determining received power of the multiple subcarriers based on the first and second received symbols; and
detecting for beacon signals from cells based on the received power of the multiple subcarriers, wherein the detecting for beacon signals comprises:
determining candidate subcarriers based on the received power of the multiple subcarriers, and
detecting for the beacon signals based on the candidate subcarriers and beacon patterns for the cells,
wherein the beacon patterns for the cells are defined based on multiple orthogonal groups of subcarriers, and
wherein the multiple (G) orthogonal groups of subcarriers each include the multiple (S) subcarriers, and wherein multiple (P) beacon patterns are defined based on the G orthogonal groups of S subcarriers, where P is equal to S raised to the power of G.

30. The method of claim 29, wherein the determining the received power of the multiple subcarriers comprises
determining received power of the first received symbols from each first DFT,
determining received power of the second received symbols from each second DFT, and
combining the received power of the first and second received symbols from overlapping first and second DFTs to obtain the received power of the multiple subcarriers.

31. The method of claim 29, wherein the detecting for beacon signals comprises
combining received power of subcarriers identified by each of the multiple beacon patterns, and
detecting for the cells based on the combined received power for each of the multiple beacon patterns.

32. An apparatus for wireless communication, comprising:
means for performing first discrete Fourier transforms (DFTs) based on first symbol timing to obtain first received symbols for multiple subcarriers;
means for performing second DFTs based on second symbol timing to obtain second received symbols for the multiple subcarriers;
means for determining received power of the multiple subcarriers based on the first and second received symbols; and
means for detecting for beacon signals from cells based on the received power of the multiple subcarriers, wherein the means for detecting for beacon signals comprises:
means for determining candidate subcarriers based on the received power of the multiple subcarriers, and
means for detecting for the beacon signals based on the candidate subcarriers and beacon patterns for the cells,
wherein the beacon patterns for the cells are defined based on multiple orthogonal groups of subcarriers, and
wherein the multiple (G) orthogonal groups of subcarriers each include the multiple (S) subcarriers, and wherein multiple (P) beacon patterns are defined based on the G orthogonal groups of S subcarriers, where P is equal to S raised to the power of G.

33. The apparatus of claim 32, wherein the means for determining the received power of the multiple subcarriers comprises
means for determining received power of the first received symbols from each first DFT,
means for determining received power of the second received symbols from each second DFT, and
means for combining the received power of the first and second received symbols from overlapping first and second DFTs to obtain the received power of the multiple subcarriers.

34. The apparatus of claim 32, wherein the means for detecting for beacon signals comprises
means for combining received power of subcarriers identified by each of the multiple beacon patterns, and
means for detecting for the cells based on the combined received power for each of the multiple beacon patterns.

35. A non-transitory machine-readable medium comprising instructions which, when executed by a machine, cause the machine to perform operations including:
performing first discrete Fourier transforms (DFTs) based on first symbol timing to obtain first received symbols for multiple subcarriers;
performing second DFTs based on second symbol timing to obtain second received symbols for the multiple subcarriers;
determining received power of the multiple subcarriers based on the first and second received symbols; and
detecting for beacon signals from cells based on the received power of the multiple subcarriers, wherein the detecting for beacon signals comprises:
determining candidate subcarriers based on the received power of the multiple subcarriers, and
detecting for the beacon signals based on the candidate subcarriers and beacon patterns for the cells,
wherein the beacon patterns for the cells are defined based on multiple orthogonal groups of subcarriers, and
wherein the multiple (G) orthogonal groups of subcarriers each include the multiple (S) subcarriers, and wherein multiple (P) beacon patterns are defined based on the G orthogonal groups of S subcarriers, where P is equal to S raised to the power of G.

36. An apparatus for wireless communication, comprising:
at least one processor configured to determine received power of multiple subcarriers usable for beacon signals, to combine received power of subcarriers for each of multiple beacon patterns, and to detect for cells based on the combined received power for each of the multiple beacon patterns; and
a memory coupled to the at least one processor,
wherein the at least one processor is configured to perform first discrete Fourier transforms (DFTs) based on first symbol timing to obtain first received symbols for the multiple subcarriers, and to determine the received power of the multiple subcarriers based on the first received symbols,
wherein beacon patterns for the cells are defined based on multiple orthogonal groups of subcarriers, and wherein the multiple (G) orthogonal groups of subcarriers each include the multiple (S) subcarriers, and wherein the multiple (P) beacon patterns are defined based on the G orthogonal groups of S subcarriers, where P is equal to S raised to the power of G.

37. The apparatus of claim 36, wherein the at least one processor is configured to perform second DFTs based on second symbol timing to obtain second received symbols for the multiple subcarriers, and to determine the received power of the multiple subcarriers based further on the second received symbols.

38. The apparatus of claim 37, wherein the at least one processor is configured to determine received power of the first received symbols from each first DFT, to determine received power of the second received symbols from each second DFT, and to combine the received power of the first and second received symbols from overlapping first and second DFTs to obtain the received power of the multiple subcarriers.

39. The apparatus of claim 36, wherein the at least one processor is configured to compare the combined received power for each beacon pattern against a threshold, and to declare a detected cell for each beacon pattern with combined received power exceeding the threshold.

40. The apparatus of claim 36, wherein the at least one processor is configured to determine a largest combined received power among the multiple beacon patterns, and to declare a detected cell if the largest combined received power exceeds a threshold.

41. A method for wireless communication, comprising:
determining received power of multiple subcarriers usable for beacon signals;
combining received power of subcarriers identified by each of multiple beacon patterns; and
detecting for cells based on the combined received power for each of the multiple beacon patterns,
wherein the determining the received power of the multiple subcarriers comprises:
performing first discrete Fourier transforms (DFTs) based on first symbol timing to obtain first received symbols for the multiple subcarriers, and
determining the received power of the multiple subcarriers based on the first received symbols,
wherein beacon patterns for the cells are defined based on multiple orthogonal groups of subcarriers, and wherein the multiple (G) orthogonal groups of subcarriers each include the multiple (S) subcarriers, and wherein the multiple (P) beacon patterns are defined based on the G orthogonal groups of S subcarriers, where P is equal to S raised to the power of G.

42. The method of claim 41, wherein the determining the received power of the multiple subcarriers further comprises
performing second DFTs based on second symbol timing to obtain second received symbols for the multiple subcarriers, and
determining the received power of the multiple subcarriers based further on the second received symbols.

43. The method of claim 41, wherein the detecting for cells comprises
comparing the combined received power for each beacon pattern against a threshold, and
declaring a detected cell for each beacon pattern with combined received power exceeding the threshold.

44. An apparatus for wireless communication, comprising:
means for determining received power of multiple subcarriers usable for beacon signals;
means for combining received power of subcarriers identified by each of multiple beacon patterns; and
means for detecting for cells based on the combined received power for each of the multiple beacon patterns,
wherein the means for determining the received power of the multiple subcarriers is configured to:
perform first discrete Fourier transforms (DFTs) based on first symbol timing to obtain first received symbols for the multiple subcarriers, and
determine the received power of the multiple subcarriers based on the first received symbols,
wherein beacon patterns for the cells are defined based on multiple orthogonal groups of subcarriers, and wherein the multiple (G) orthogonal groups of subcarriers each include the multiple (S) subcarriers, and wherein the multiple (P) beacon patterns are defined based on the G orthogonal groups of S subcarriers, where P is equal to S raised to the power of G.

45. A non-transitory machine-readable medium comprising instructions which, when executed by a machine, cause the machine to perform operations including:
determining received power of multiple subcarriers usable for beacon signals;
combining received power of subcarriers identified by each of multiple beacon patterns; and
detecting for cells based on the combined received power for each of the multiple beacon patterns,
wherein the determining the received power of the multiple subcarriers comprises:
performing first discrete Fourier transforms (DFTs) based on first symbol timing to obtain first received symbols for the multiple subcarriers, and
determining the received power of the multiple subcarriers based on the first received symbols,
wherein beacon patterns for the cells are defined based on multiple orthogonal groups of subcarriers, and wherein the multiple (G) orthogonal groups of subcarriers each include the multiple (S) subcarriers, and wherein the multiple (P) beacon patterns are defined based on the G orthogonal groups of S subcarriers, where P is equal to S raised to the power of G.

46. An apparatus for wireless communication, comprising:
means for determining a transmit power level for a beacon signal from a cell, the transmit power level being configurable for the cell and different from transmit power levels for beacon signals from neighboring cells; and
means for generating the beacon signal for transmission at the determined transmit power level, the beacon signal from the cell being based on a beacon pattern identifying multiple subcarriers to use for the beacon signal in multiple symbol periods, each of the multiple subcarriers being from a different one of multiple orthogonal groups of subcarriers, wherein the multiple (G) orthogonal groups of subcarriers each include multiple (S) subcarriers, and wherein multiple (P) beacon patterns are defined based on the G orthogonal groups of S subcarriers, where P is equal to S raised to the power of G.

47. A non-transitory machine-readable medium comprising instructions which, when executed by a machine, cause the machine to perform operations including:
determining a transmit power level for a beacon signal from a cell, the transmit power level being configurable for the cell and different from transmit power levels for beacon signals from neighboring cells; and
generating the beacon signal for transmission at the determined transmit power level, the beacon signal from the cell being based on a beacon pattern identifying multiple subcarriers to use for the beacon signal in multiple symbol periods, each of the multiple subcarriers being from a different one of multiple orthogonal groups of subcarriers, wherein the multiple (G) orthogonal groups of subcarriers each include multiple (S) subcarriers, and wherein multiple (P) beacon patterns are defined based on the G orthogonal groups of S subcarriers, where P is equal to S raised to the power of G.

* * * * *